(12) United States Patent
Sano et al.

(10) Patent No.: US 11,514,940 B2
(45) Date of Patent: *Nov. 29, 2022

(54) MAGNETIC RECORDING MEDIUM AND MAGNETIC RECORDING AND REPRODUCING DEVICE

(71) Applicant: FUJIFILM Corporation, Tokyo (JP)

(72) Inventors: Naoki Sano, Minami-ashigara (JP); Takuto Kurokawa, Minami-ashigara (JP); Norihito Kasada, Minami-ashigara (JP); Eiki Ozawa, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 1 day.

This patent is subject to a terminal disclaimer.

(21) Appl. No.: 16/569,103

(22) Filed: Sep. 12, 2019

(65) Prior Publication Data

US 2020/0090694 A1 Mar. 19, 2020

(30) Foreign Application Priority Data

Sep. 14, 2018 (JP) .............................. JP2018-172671
Nov. 6, 2018 (JP) .............................. JP2018-209078
Mar. 29, 2019 (JP) .............................. JP2019-066049
May 15, 2019 (JP) .............................. JP2019-092248

(51) Int. Cl.
*G11B 5/66* (2006.01)
*G11B 5/708* (2006.01)
*G11B 5/845* (2006.01)

(52) U.S. Cl.
CPC .............. *G11B 5/66* (2013.01); *G11B 5/708* (2013.01); *G11B 5/845* (2013.01)

(58) Field of Classification Search
CPC ........... G11B 5/66; G11B 5/708; G11B 5/845; G11B 5/70; G11B 5/73927
See application file for complete search history.

(56) References Cited

U.S. PATENT DOCUMENTS

| | | | |
|---|---|---|---|
| 7,755,863 B2 | 7/2010 | Neumann et al. | |
| 8,535,817 B2 | 9/2013 | Imaoka | |
| 8,947,984 B2* | 2/2015 | Hattori | G11B 5/7305 369/13.14 |
| 9,502,066 B2* | 11/2016 | Hosoya | G11B 5/70678 |
| 10,366,721 B2 | 7/2019 | Kasada | |
| 10,679,657 B2 | 6/2020 | Kurokawa et al. | |
| 10,741,208 B2 | 8/2020 | Kurokawa et al. | |
| 10,811,048 B2 | 10/2020 | Ozawa et al. | |
| 11,189,318 B2 | 11/2021 | Kasada | |
| 11,211,087 B2 | 12/2021 | Ozawa et al. | |
| 11,250,881 B2 | 2/2022 | Kasada | |
| 11,270,725 B2 | 3/2022 | Sano et al. | |
| 11,270,728 B2 | 3/2022 | Kurokawa et al. | |
| 2010/0323222 A1 | 12/2010 | Nakashio et al. | |
| 2012/0045664 A1 | 2/2012 | Tanaka et al. | |
| 2015/0187380 A1 | 7/2015 | Shirata | |
| 2016/0064025 A1* | 3/2016 | Kurokawa | G11B 5/71 428/840.4 |
| 2016/0171993 A1 | 6/2016 | Okubo | |
| 2019/0304498 A1 | 10/2019 | Ozawa et al. | |
| 2020/0251136 A1 | 8/2020 | Ozawa et al. | |
| 2020/0251138 A1 | 8/2020 | Ozawa et al. | |
| 2020/0302962 A1 | 9/2020 | Sawayashiki et al. | |
| 2020/0312361 A1 | 10/2020 | Kasada | |
| 2020/0342901 A1 | 10/2020 | Enomoto et al. | |
| 2020/0342903 A1 | 10/2020 | Kasada | |
| 2020/0365179 A1 | 11/2020 | Kasada | |
| 2021/0090602 A1 | 3/2021 | Sano et al. | |
| 2021/0241792 A1 | 8/2021 | Kurokawa et al. | |
| 2021/0287702 A1 | 9/2021 | Ozawa et al. | |
| 2021/0375311 A1 | 12/2021 | Ozawa et al. | |

FOREIGN PATENT DOCUMENTS

| | | |
|---|---|---|
| JP | 2011-028826 A | 2/2011 |
| JP | 2011-134372 A | 7/2011 |
| JP | 2012-043495 A | 3/2012 |
| JP | 2015-127985 A | 7/2015 |
| JP | 2016-110680 A | 6/2016 |
| JP | 2017-139044 A | 8/2017 |
| JP | 2017-168178 A | 9/2017 |
| JP | 2018-133120 A | 8/2018 |
| JP | 6590104 B1 | 10/2019 |

OTHER PUBLICATIONS

Office Action dated Apr. 20, 2021, from the Japanese Patent Office in Japanese application No. 2019-092248.
Office Action dated Mar. 15, 2022 in U.S. Appl. No. 17/160,535.
Notice of Allowance dated Aug. 6, 2020 in U.S. Appl. No. 16/777,279.
Notice of Allowance dated Jul. 20, 2022 in U.S. Appl. No. 17/160,535.

* cited by examiner

*Primary Examiner* — Holly Rickman
*Assistant Examiner* — Linda N Chau
(74) *Attorney, Agent, or Firm* — Sughrue Mion, PLLC

(57) ABSTRACT

The magnetic recording medium includes a non-magnetic support; and a magnetic layer including a ferromagnetic powder and a binding agent on the non-magnetic support, in which a difference ($S_{0.5}-S_{13.5}$) between a spacing $S_{0.5}$ measured by optical interferometry regarding a surface of the magnetic layer under a pressing force of 0.5 atm after n-hexane cleaning and a spacing $S_{13.5}$ measured by optical interferometry regarding the surface of the magnetic layer under a pressing force of 13.5 atm after n-hexane cleaning is equal to or smaller than 3.0 nm, and a magnetic recording and reproducing device including this magnetic recording medium.

14 Claims, No Drawings

MAGNETIC RECORDING MEDIUM AND MAGNETIC RECORDING AND REPRODUCING DEVICE

CROSS-REFERENCE TO RELATED APPLICATIONS

This application claims priority under 35 U.S.C 119 to Japanese Patent Application No. 2018-172671 filed on Sep. 14, 2018, Japanese Patent Application No. 2018-209078 filed on Nov. 6, 2018, Japanese Patent Application No. 2019-066049 filed on Mar. 29, 2019 and Japanese Patent Application No. 2019-092248 filed on May 15, 2019. Each of the above applications is hereby expressly incorporated by reference, in its entirety, into the present application.

BACKGROUND OF THE INVENTION

1. Field of the Invention

The present invention relates to a magnetic recording medium and a magnetic recording and reproducing device.

2. Description of the Related Art

In related art, it has been proposed that a shape of a surface of a magnetic layer is controlled by forming a projection on the surface of the magnetic layer (for example, see JP2011-028826A and JP2017-168178A).

SUMMARY OF THE INVENTION

In a slide type magnetic recording and reproducing device, the recording of information on a magnetic recording medium and the reproducing of the recorded information are performed by bringing a surface of a magnetic layer of the magnetic recording medium and a magnetic head into contact with each other to slide on each other. A high coefficient of friction during the sliding between the surface of the magnetic layer and the magnetic head is a reason for a deterioration in running stability or the like. With respect to this, the control of the shape of the surface of the magnetic layer can contribute to a decrease in coefficient of friction described above.

In order to record information on a magnetic recording medium and reproduce the recorded information, the sliding between the surface of the magnetic layer and the magnetic head is repeated. Regards to this point, as proposed in the related art, even in a case where a low coefficient of friction can be realized in an initial stage of the sliding by controlling the shape of the surface of the magnetic layer, a phenomenon of an increase in coefficient of friction, while repeating the sliding, may occur.

An aspect of the invention provides for a magnetic recording medium capable of preventing an increase in coefficient of friction, even in a case where the sliding with the magnetic head is repeated.

According to one aspect of the invention, there is provided a magnetic recording medium comprising: a non-magnetic support; and a magnetic layer including a ferromagnetic powder and a binding agent on the non-magnetic support, in which a difference ($S_{0.5}$–$S_{13.5}$) between a spacing $S_{0.5}$ measured by optical interferometry regarding a surface of the magnetic layer under a pressing force of 0.5 atm after n-hexane cleaning and a spacing $S_{13.5}$ measured by optical interferometry regarding the surface of the magnetic layer under a pressing force of 13.5 atm after n-hexane cleaning is equal to or smaller than 3.0 nm. Hereinafter, the difference ($S_{0.5}$–$S_{13.5}$) is also simply referred to as a "difference". In addition, 1 atm=101325 Pa (pascal).

In an embodiment, the difference may be 1.5 nm to 3.0 nm.

In an embodiment, the $S_{0.5}$ may be 5.0 to 50.0 nm.

In an embodiment, the magnetic layer may include inorganic oxide particles.

In an embodiment, the inorganic oxide particles may be composite particles of inorganic oxide and a polymer.

In an embodiment, the magnetic layer may include one or more kinds of lubricant selected from the group consisting of fatty acid, fatty acid ester, and fatty acid amide.

In an embodiment, the magnetic recording medium may further comprise a non-magnetic layer including a non-magnetic powder and a binding agent between the non-magnetic support and the magnetic layer.

In an embodiment, the magnetic recording medium may further comprise a back coating layer including a non-magnetic powder and a binding agent on a surface of the non-magnetic support opposite to a surface provided with the magnetic layer.

In an embodiment, the magnetic recording medium may be a magnetic tape.

In an embodiment, the non-magnetic support may be an aromatic polyester support.

A Young's modulus of the aromatic polyester support may be equal to or greater than 3000 N/mm$^2$ in a longitudinal direction and equal to or greater than 4000 N/mm$^2$ in a width direction.

In an embodiment, the ferromagnetic powder may be a hexagonal barium ferrite powder.

In an embodiment, the ferromagnetic powder may be a hexagonal strontium ferrite powder.

In an embodiment, the ferromagnetic powder may be an ε-iron oxide powder.

According to another aspect of the invention, there is provided a magnetic recording and reproducing device comprising: the magnetic recording medium; and a magnetic head.

According to the aspect of the invention, it is possible to provide a magnetic recording medium capable of preventing an increase in coefficient of friction, even in a case where the sliding on the magnetic head is repeated. In addition, according to the other aspect of the invention, it is possible to provide a magnetic recording and reproducing device including the magnetic recording medium.

DESCRIPTION OF THE PREFERRED EMBODIMENTS

Magnetic Recording Medium

One aspect of the invention relates to a magnetic recording medium including: a non-magnetic support; and a magnetic layer including a ferromagnetic powder and a binding agent on the non-magnetic support, in which a difference ($S_{0.5}$–$S_{13.5}$) between a spacing $S_{0.5}$ measured by optical interferometry regarding a surface of the magnetic layer under a pressing force of 0.5 atm after n-hexane cleaning and a spacing $S_{13.5}$ measured by optical interferometry regarding the surface of the magnetic layer under a pressing force of 13.5 atm after n-hexane cleaning is equal to or smaller than 3.0 nm.

In the invention and the specification, the "n-hexane cleaning" means ultrasonic cleaning (ultrasonic output: 40 kHz) performed for 100 seconds by dipping a sample piece cut out from the magnetic recording medium into fresh n-hexane (200 g) at a liquid temperature of 20° C. to 25° C. In a case where the magnetic recording medium which is a cleaning target is a magnetic tape, a sample piece having a length of 5 cm is cut out and subjected to n-hexane cleaning. A width of the magnetic tape and a width of the sample piece cut out from the magnetic tape are normally ½ inches. 1 inch=0.0254 meters. Regarding a magnetic tape having a width other than the width of ½ inches, a sample piece having a length of 5 cm may be cut out and subjected to n-hexane cleaning. In a case where the magnetic recording medium which is a cleaning target is a magnetic disk, a sample piece having a size of 5 cm×1.27 cm is cut out and subjected to n-hexane cleaning. The measurement of the spacing described below is performed, after the sample piece after the n-hexane cleaning is left in an environment of a temperature of 23° C. and relative humidity of 50% for 24 hours.

In the invention and the specification, the "surface of the magnetic layer" of the magnetic recording medium is identical to the surface of the magnetic recording medium on the magnetic layer side.

In the invention and the specification, the spacing measured by optical interferometry regarding the surface of the magnetic layer of the magnetic recording medium is a value measured by the following method.

In a state where the magnetic recording medium (specifically, the sample piece. The same applies hereinafter) and a transparent plate-shaped member (for example, glass plate or the like) are overlapped onto each other so that the surface of the magnetic layer of the magnetic recording medium faces the transparent plate-shaped member, a pressing member is pressed against the side of the magnetic recording medium opposite to the magnetic layer side at pressure of 0.5 atm or 13.5 atm. In this state, the surface of the magnetic layer of the magnetic recording medium is irradiated with light through the transparent plate-shaped member (irradiation region: 150,000 to 200,000 $\mu m^2$), and a spacing (distance) between the surface of the magnetic layer of the magnetic recording medium and the surface of the transparent plate-shaped member on the magnetic recording medium is acquired based on intensity (for example, contrast of interference fringe image) of interference light generated due to a difference in a light path between reflected light from the surface of the magnetic layer of the magnetic recording medium and reflected light from the surface of the transparent plate-shaped member on the magnetic recording medium. The light emitted here is not particularly limited. In a case where the emitted light is light having an emission wavelength over a comparatively wide wavelength range as white light including light having a plurality of wavelengths, a member having a function of selectively cutting light having a specific wavelength or a wavelength other than wavelengths in a specific wavelength range, such as an interference filter, is disposed between the transparent plate-shaped member and a light receiving unit which receives reflected light, and light at some wavelengths or in some wavelength ranges of the reflected light is selectively incident to the light receiving unit. In a case where the light emitted is light (so-called monochromatic light) having a single luminescence peak, the member described above may not be used. The wavelength of light incident to the light receiving unit can be set to be 500 to 700 nm, for example. However, the wavelength of light incident to the light receiving unit is not limited to be in the range described above. In addition, the transparent plate-shaped member may be a member having transparency through which emitted light passes, to the extent that the magnetic recording medium is irradiated with light through this member and interference light is obtained.

The interference fringe image obtained by the measurement of the spacing described above is divided into 300,000 points, a spacing of each point (distance between the surface of the magnetic layer of the magnetic recording medium and the surface of the transparent plate-shaped member on the magnetic recording medium side) is acquired, this spacing is shown with a histogram, and a mode of this histogram is set as the spacing.

Five sample pieces are cut out from the same magnetic recording medium, a spacing $S_{0.5}$ of each test sample is obtained by pressing a pressing member at pressure of 0.5 atm after the n-hexane cleaning, and a spacing $S_{13.5}$ of each test sample is obtained by pressing the pressing member at pressure of 13.5 atm. An arithmetical mean of the spacings of the five sample pieces obtained under pressure of 0.5 atm after the n-hexane cleaning is set as a spacing $S_{0.5}$, and an arithmetical mean of the spacings of the five sample pieces obtained under pressure of 13.5 atm after the n-hexane cleaning is set as a spacing $S_{13.5}$. A difference ($S_{0.5}-S_{13.5}$) between $S_{0.5}$ and $S_{13.5}$ obtained as described above is set as the difference ($S_{0.5}-S_{13.5}$) of the magnetic recording medium.

The above measurement can be performed by using a commercially available tape spacing analyzer (TSA) such as Tape Spacing Analyzer manufactured by Micro Physics, Inc., for example. The spacing measurement of the examples was performed by using Tape Spacing Analyzer manufactured by Micro Physics, Inc.

A coefficient of friction during the sliding between the surface of the magnetic layer and the magnetic head can be decreased by forming a projection on the surface of the magnetic layer to reduce the area of the portion of the surface of the magnetic layer in contact with the magnetic head (so-called real contact). However, in a case where a height of the projection on the surface of the magnetic layer is reduced by repeating the sliding with the magnetic head, the area of the portion on the surface of the magnetic layer in real-contact with the magnetic head is increased, and the coefficient of friction is increased.

Regards to the point described above, in the intensive studies, the inventors have thought that, pressure applied to the surface of the magnetic layer during repeating the sliding with the magnetic head is not constant, a large pressure may be applied, and in a case where the large pressure is applied, the deformation of the projection or a decrease in height of the projection due to the pressure applied to the inner portion of the magnetic layer is a reason for an increase in coefficient of friction, in a case where the sliding with the magnetic head is repeated. A case where a large pressure is applied may be the sliding with an edge portion of the magnetic head, for example. With respect to this, a difference ($S_{0.5}-S_{13.5}$) between $S_{0.5}$ and $S_{13.5}$ obtained by the method described above that is small as equal to or smaller than 3.0 nm shows that a large change in height of the projection on the surface of the magnetic layer hardly occurs, even in a case where a large pressure is applied. Accordingly, it is thought that, in the magnetic recording medium having the difference equal to or smaller than 3.0 nm, a change in height of the projection on the surface of the magnetic layer is slight, even in a case where the sliding with the magnetic head is repeated. According to the magnetic recording medium, inventors have surmised that this is a reason for preventing an increase in coefficient of friction, even in a case where the sliding with the magnetic head is repeated.

However, the invention is not limited to the surmise. However, regarding the pressure during the pressure applying in the measurement of the spacing, in the invention, 0.5 atm is used as an exemplified value of the pressure mainly applied to the surface of the magnetic layer during the sliding with the magnetic head, and 13.5 atm is used as an exemplified value of a large pressure applied to the surface of the magnetic layer during the sliding with the magnetic head, and the pressure applied to the magnetic recording medium during the sliding with the magnetic head is not limited to the pressures described above. As a result of the intensive studies of the inventors, it is newly found that an increase in coefficient of friction is prevented, even in a case where the sliding with the magnetic head is repeated, by controlling the difference obtained by using the pressure. A controlling method of the difference will be described later.

Hereinafter, the magnetic recording medium will be described more specifically. Hereinafter, an increase in coefficient of friction realized by repeating the sliding of the surface of the magnetic layer and the magnetic head is also referred to as an "increase in coefficient of friction".

Magnetic Layer

Difference($S_{0.5}$–$S_{13.5}$)

The difference ($S_{0.5}$–$S_{13.5}$) of the magnetic recording medium is equal to or smaller than 3.0 nm, preferably equal to or smaller than 2.9 nm, more preferably equal to or smaller than 2.8 nm, even more preferably equal to or smaller than 2.7 nm, still preferably equal to or smaller than 2.6 nm, and still more preferably equal to or smaller than 2.5 nm, from a viewpoint of further preventing an increase in coefficient of friction. In addition, the difference can be, for example, equal to or greater than 1.0 nm, equal to or greater than 1.5 nm, equal to or greater than 1.8 nm, or equal to or greater than 2.0 nm. However, a smaller difference is preferable, from a viewpoint of preventing an increase in coefficient of friction, a lower value of the exemplified lower limit can also be used. The difference can be controlled depending on the kind of a non-magnetic filler (hereinafter, referred to as a "projection formation agent") capable of forming the projection on the magnetic layer manufacturing conditions of the magnetic recording medium. The details of this point will be described later.

The $S_{0.5}$–$S_{13.5}$ of the magnetic recording medium is not particularly limited, as long as the difference ($S_{0.5}$–$S_{13.5}$) is equal to or smaller than 3.0 nm. From a viewpoint of improving electromagnetic conversion characteristics, the $S_{0.5}$ is preferably equal to or smaller than 50.0 nm, more preferably equal to or smaller than 40.0 nm, even more preferably equal to or smaller than 30.0 nm, still preferably equal to or smaller than 20.0 nm, still more preferably equal to or smaller than 16.0 nm, still even more preferably equal to or smaller than 15.5 nm, and still further more preferably equal to or smaller than 14.5 nm. In addition, from a viewpoint of suppressing mainly the coefficient of friction in an initial stage of the sliding with the magnetic head to be low, the $S_{0.5}$ is preferably equal to or greater than 5.0 nm, more preferably equal to or greater than 8.0 nm, even more preferably equal to or greater than 10.0 nm, still preferably equal to or greater than 12.0 nm. From a viewpoint of maintaining excellent running stability, even in a case where the sliding with the magnetic head is repeated, the $S_{13.5}$ is preferably equal to or greater than 5.0 nm, more preferably equal to or greater than 8.0 nm, and even more preferably equal to or greater than 10.0 nm. In addition, from a viewpoint of exhibiting excellent electromagnetic conversion characteristics, even in a case where the sliding with the magnetic head is repeated, the $S_{13.5}$ is preferably equal to or smaller than 15.0 nm, more preferably equal to or smaller than 14.0 nm, even more preferably equal to or smaller than 13.5 nm, still preferably equal to or smaller than 13.0 nm, and still more preferably equal to or smaller than 12.0 nm.

Ferromagnetic Powder

As the ferromagnetic powder included in the magnetic layer, a well-known magnetic powder can be used as one kind or in combination of two or more kinds, as the magnetic powder used in the magnetic layer of various magnetic recording media. It is preferable to use ferromagnetic powder having a small average particle size, from a viewpoint of improvement of recording density. From this viewpoint, an average particle size of the ferromagnetic powder is preferably equal to or smaller than 50 nm, more preferably equal to or smaller than 45 nm, even more preferably equal to or smaller than 40 nm, still preferably equal to or smaller than 35 nm, still more preferably equal to or smaller than 30 nm, still even more preferably equal to or smaller than 25 nm, and still further more preferably equal to or smaller than 20 nm. Meanwhile, the average particle size of the ferromagnetic powder is preferably equal to or greater than 5 nm, more preferably equal to or greater than 8 nm, even more preferably equal to or greater than 10 nm, still preferably equal to or greater than 15 nm, still more preferably equal to or greater than 20 nm.

Hexagonal Ferrite Powder

As a preferred specific example of the ferromagnetic powder, hexagonal ferrite powder can be used. For details of the hexagonal ferrite powder, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to, for example.

In the invention and the specification, the "hexagonal ferrite powder" is ferromagnetic powder in which a hexagonal ferrite type crystal structure is detected as a main phase by X-ray diffraction analysis. The main phase is a structure to which a diffraction peak at the highest intensity in the X-ray diffraction spectrum obtained by the X-ray diffraction analysis is belonged. For example, in a case where the diffraction peak at the highest intensity in the X-ray diffraction spectrum obtained by the X-ray diffraction analysis is belonged to the hexagonal ferrite type crystal structure, it is determined that the hexagonal ferrite type crystal structure is detected as the main phase. In a case where only a single structure is detected by the X-ray diffraction analysis, this detected structure is the main phase. The hexagonal ferrite type crystal structure includes at least an iron atom, a divalent metal atom, and an oxide atom, as the constituent atom. A divalent metal atom is a metal atom which can be divalent cations as ions, and examples thereof include an alkali earth metal atom such as a strontium atom, a barium atom, or a calcium atom, and a lead atom. In the invention and the specification, the hexagonal strontium ferrite powder is powder in which main divalent metal atom included in this powder is a strontium atom, and the hexagonal barium ferrite powder is powder in which the main divalent metal atom included in this powder is a barium atom. The main divalent metal atom is a divalent metal atom occupying the greatest content in the divalent metal atom included in the powder based on atom %. Here, the rare earth atom is not included in the divalent metal atom. The "rare earth atom" of the invention and the specification is selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), an europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder according to one aspect of the hexagonal ferrite powder will be described more specifically.

An activation volume of the hexagonal strontium ferrite powder is preferably 800 to 1600 nm$^3$. The atomized hexagonal strontium ferrite powder having the activation volume in the range described above is suitable for manufacturing a magnetic recording medium exhibiting excellent electromagnetic conversion characteristics. The activation volume of the hexagonal strontium ferrite powder is preferably equal to or greater than 800 nm$^3$, and can be, for example, equal to or greater than 850 nm$^3$. In addition, from a viewpoint of further improving electromagnetic conversion characteristics, the activation volume of the hexagonal strontium ferrite powder is more preferably equal to or smaller than 1500 nm$^3$, even more preferably equal to or smaller than 1400 nm$^3$, still preferably equal to or smaller than 1300 nm$^3$, still more preferably equal to or smaller than 1200 nm$^3$, and still even more preferably equal to or smaller than 1100 nm$^3$. The same applies to the activation volume of the hexagonal barium ferrite powder.

The "activation volume" is a unit of magnetization reversal and an index showing a magnetic magnitude of the particles. Regarding the activation volume and an anisotropy constant Ku which will be described later disclosed in the invention and the specification, magnetic field sweep rates of a coercivity Hc measurement part at time points of 3 minutes and 30 minutes are measured by using an oscillation sample type magnetic-flux meter (measurement temperature: 23° C.±1° C.), and the activation volume and the anisotropy constant Ku are values acquired from the following relational expression of Hc and an activation volume V. A unit of the anisotropy constant Ku is 1 erg/cc=1.0×10$^{-1}$ J/m$^3$.

$$Hc=2Ku/Ms\{1-[(kT/KuV)\ln(At/0.693)]^{1/2}\}$$

[In the expression, Ku: anisotropy constant (unit: J/m$^3$), Ms: saturation magnetization (unit: kA/m), k: Boltzmann's constant, T: absolute temperature (unit: K), V: activation volume (unit: cm$^3$), A: spin precession frequency (unit: s$^{-1}$), and t: magnetic field reversal time (unit: s)]

The anisotropy constant Ku can be used as an index of reduction of thermal fluctuation, that is, improvement of thermal stability. The hexagonal strontium ferrite powder can preferably have Ku equal to or greater than 1.8×10$^5$ J/m$^3$, and more preferably have Ku equal to or greater than 2.0×10$^5$ J/m$^3$. In addition, Ku of the hexagonal strontium ferrite powder can be, for example, equal to or smaller than 2.5×10$^5$ J/m$^3$. However, the high Ku is preferable, because it means high thermal stability, and thus, Ku is not limited to the exemplified value.

The hexagonal strontium ferrite powder may or may not include the rare earth atom. In a case where the hexagonal strontium ferrite powder includes the rare earth atom, a content (bulk content) of the rare earth atom is preferably 0.5 to 5.0 atom % with respect to 100 atom % of the iron atom. In one aspect, the hexagonal strontium ferrite powder including the rare earth atom can have rare earth atom surface layer portion uneven distribution. The "rare earth atom surface layer portion uneven distribution" of the invention and the specification means that a content of rare earth atom with respect to 100 atom % of iron atom in a solution obtained by partially dissolving the hexagonal strontium ferrite powder with acid (hereinafter, referred to as a "rare earth atom surface layer portion content" or simply a "surface layer portion content" regarding the rare earth atom) and a content of rare earth atom with respect to 100 atom % of iron atom in a solution obtained by totally dissolving the hexagonal strontium ferrite powder with acid (hereinafter, referred to as a "rare earth atom bulk content" or simply a "bulk content" regarding the rare earth atom) satisfy a ratio of rare earth atom surface layer portion content/rare earth atom bulk content >1.0. The content of rare earth atom of the hexagonal strontium ferrite powder which will be described later is identical to the rare earth atom bulk content. With respect to this, the partial dissolving using acid is to dissolve the surface layer portion of particles configuring the hexagonal strontium ferrite powder, and accordingly, the content of rare earth atom in the solution obtained by the partial dissolving is the content of rare earth atom in the surface layer portion of the particles configuring the hexagonal strontium ferrite powder. The rare earth atom surface layer portion content satisfying a ratio of "rare earth atom surface layer portion content/rare earth atom bulk content >1.0" means that the rare earth atoms are unevenly distributed in the surface layer portion (that is, a larger amount of the rare earth atoms is present, compared to that inside), among the particles configuring the hexagonal strontium ferrite powder. The surface layer portion of the specification and the specification means a part of the region of the particles configuring the hexagonal strontium ferrite powder from the inside from the surface.

In a case where the hexagonal strontium ferrite powder includes the rare earth atom, the rare earth atom bulk content (bulk content) is preferably 0.5 to 5.0 atom % with respect to 100 atom % of the iron atom. It is thought that the hexagonal strontium ferrite powder including the rare earth atom having the bulk content in the range described above and uneven distribution of the rare earth atom in the surface layer portion of the particles configuring the hexagonal strontium ferrite powder contribute to the prevention of reduction of reproduction output during the repeated reproduction. It is surmised that this is because the anisotropy constant Ku can be increased due to the hexagonal strontium ferrite powder including the rare earth atom having the bulk content in the range described above and uneven distribution of the rare earth atom in the surface layer portion of the particles configuring the hexagonal strontium ferrite powder. As the value of the anisotropy constant Ku is high, occurrence of a phenomenon, so-called thermal fluctuation can be prevented (that is, thermal stability can be improved). By preventing the occurrence of thermal fluctuation, it is possible to prevent reduction of the reproduction output during the repeated reproduction. It is surmised that, the uneven distribution of the rare earth atom in the surface layer portion of the hexagonal strontium ferrite powder contributes to stabilization of a spin at an iron (Fe) site in a crystal lattice of the surface layer portion, thereby increasing the anisotropy constant Ku.

It is surmised that the use of the hexagonal strontium ferrite powder having the rare earth atom surface layer portion uneven distribution as the ferromagnetic powder of the magnetic layer contributes to the prevention of chipping of the surface of the magnetic layer due to the sliding with the magnetic head. That is, it is surmised that the hexagonal strontium ferrite powder having the rare earth atom surface layer portion uneven distribution also contributes to the improvement of running durability of the magnetic recording medium. It is surmised that this is because the uneven distribution of the rare earth atom on the surface of the particles configuring the hexagonal strontium ferrite powder contributes to improvement of an interaction between the surface of the particles and an organic substance (for example, binding agent and/or additive) included in the magnetic layer, thereby improving hardness of the magnetic layer.

From a viewpoint of further preventing the reproduction output in the repeated reproduction and/or a viewpoint of further improving running durability, the content of rare earth atom (bulk content) is more preferably 0.5 to 4.5 atom %, even more preferably 1.0 to 4.5 atom %, and still preferably 1.5 to 4.5 atom %.

The bulk content is a content obtained by totally dissolving the hexagonal strontium ferrite powder. In the invention and the specification, the content of the atom is a bulk content obtained by totally dissolving the hexagonal strontium ferrite powder, unless otherwise noted. The hexagonal strontium ferrite powder including the rare earth atom may include only one kind of rare earth atom or may include two or more kinds of rare earth atom, as the rare earth atom. In a case where two or more kinds of rare earth atom are included, the bulk content is obtained from the total of the two or more kinds of rare earth atom. The same also applies to the other components of the invention and the specification. That is, for a given component, only one kind may be used or two or more kinds may be used, unless otherwise noted. In a case where two or more kinds are used, the content is a content of the total of the two or more kinds.

In a case where the hexagonal strontium ferrite powder includes the rare earth atom, the rare earth atom included therein may be any one or more kinds of the rare earth atom. Examples of the rare earth atom preferable from a viewpoint of further preventing reduction of the reproduction output during the repeated reproduction include a neodymium atom, a samarium atom, an yttrium atom, and a dysprosium atom, a neodymium atom, a samarium atom, an yttrium atom are more preferable, and a neodymium atom is even more preferable.

In the hexagonal strontium ferrite powder having the rare earth atom surface layer portion uneven distribution, a degree of uneven distribution of the rare earth atom is not limited, as long as the rare earth atom is unevenly distributed in the surface layer portion of the particles configuring the hexagonal strontium ferrite powder. For example, regarding the hexagonal strontium ferrite powder having the rare earth atom surface layer portion uneven distribution, a ratio of the surface layer portion content of the rare earth atom obtained by partial dissolving performed under the dissolving conditions which will be described later and the bulk content of the rare earth atom obtained by total dissolving performed under the dissolving conditions which will be described later, "surface layer portion content/bulk content" is greater than 1.0 and can be equal to or greater than 1.5. The "surface layer portion/bulk content" greater than 1.0 means that the rare earth atom is unevenly distributed in the surface layer portion (that is, a larger amount of the rare earth atoms is present, compared to that inside), among the particles configuring the hexagonal strontium ferrite powder. In addition, the ratio of the surface layer portion content of the rare earth atom obtained by partial dissolving performed under the dissolving conditions which will be described later and the bulk content of the rare earth atom obtained by total dissolving performed under the dissolving conditions which will be described later, "surface layer portion content/bulk content" can be, for example, equal to or smaller than 10.0, equal to or smaller than 9.0, equal to or smaller than 8.0, equal to or smaller than 7.0, equal to or smaller than 6.0, equal to or smaller than 5.0, or equal to or smaller than 4.0. However, in the hexagonal strontium ferrite powder having the rare earth atom surface layer portion uneven distribution, the "surface layer portion content/bulk content" is not limited to the exemplified upper limit or the lower limit, as long as the rare earth atom is unevenly distributed in the surface layer portion of the particles configuring the hexagonal strontium ferrite powder.

The partial dissolving and the total dissolving of the hexagonal strontium ferrite powder will be. described below. Regarding the hexagonal strontium ferrite powder present as the powder, sample powder for the partial dissolving and the total dissolving are collected from powder of the same batch. Meanwhile, regarding the hexagonal strontium ferrite powder included in a magnetic layer of a magnetic recording medium, a part of the hexagonal strontium ferrite powder extracted from the magnetic layer is subjected to the partial dissolving and the other part is subjected to the total dissolving. The extraction of the hexagonal strontium ferrite powder from the magnetic layer can be performed by a method disclosed in a paragraph 0032 of JP2015-091747A.

The partial dissolving means dissolving performed so that the hexagonal strontium ferrite powder remaining in the solution can be visually confirmed at the time of the completion of the dissolving. For example, by performing the partial dissolving, a region of the particles configuring the hexagonal strontium ferrite powder which is 10% to 20% by mass with respect to 100% by mass of a total of the particles can be dissolved. On the other hand, the total dissolving means dissolving performed until the hexagonal strontium ferrite powder in the solution is not visually confirmed at the time of the completion of the dissolving.

The partial dissolving and the measurement of the surface layer portion content are, for example, performed by the following method. However, dissolving conditions such as the amount of sample powder and the like described below are merely examples, and dissolving conditions capable of performing the partial dissolving and the total dissolving can be randomly used.

A vessel (for example, beaker) containing 12 mg of sample powder and 10 ml of hydrochloric acid having a concentration of 1 mol/L is held on a hot plate at a set temperature of 70° C. for 1 hour. The obtained solution is filtered with a membrane filter having a hole diameter of 0.1 μm. The element analysis of the solution obtained as described above is performed by an inductively coupled plasma (ICP) analysis device. By doing so, the rare earth atom surface layer portion content with respect to 100 atom % of the iron atom can be obtained. In a case where a plurality of kinds of rare earth atoms are detected from the element analysis, a total content of the entirety of the rare earth atoms is the surface layer portion content. The same applies to the measurement of the bulk content.

Meanwhile, the total dissolving and the measurement of the bulk content are, for example, performed by the following method.

A vessel (for example, beaker) containing 12 mg of sample powder and 10 ml of hydrochloric acid having a concentration of 4 mol/L is held on a hot plate at a set temperature of 80° C. for 3 hours. After that, the process is performed in the same manner as in the partial dissolving and the measurement of the surface layer portion content, and the bulk content with respect to 100 atom % of the iron atom can be obtained.

From a viewpoint of increasing reproducing output in a case of reproducing data recorded on a magnetic recording medium, it is desirable that the mass magnetization σs of ferromagnetic powder included in the magnetic recording medium is high. In regards to this point, in hexagonal strontium ferrite powder which includes the rare earth atom but does not have the rare earth atom surface layer portion uneven distribution, σs tends to significantly decrease, compared to that in hexagonal strontium ferrite powder not including the rare earth atom. With respect to this, it is thought that the hexagonal strontium ferrite powder having the rare earth atom surface layer portion uneven distribution is preferable for preventing such a significant decrease in σs. In one aspect, σs of the hexagonal strontium ferrite powder can be equal to or greater than 45 A·m$^2$/kg and can also be equal to or greater than 47 A·m$^2$/kg. On the other hand, from a viewpoint of noise reduction, σs is preferably equal to or smaller than 80 A·m$^2$/kg and more preferably equal to or smaller than 60 A·m$^2$/kg. σs can be measured by using a well-known measurement device capable of measuring magnetic properties such as an oscillation sample type magnetic-flux meter. In the invention and the specification, the mass magnetization σs is a value measured at a magnetic field strength of 15 kOe, unless otherwise noted. 1 [kOe]= $10^6/4\pi$ [A/m]

Regarding the content (bulk content) of the constituting atom in the hexagonal strontium ferrite powder, a content of the strontium atom can be, for example, 2.0 to 15.0 atom % with respect to 100 atom % of the iron atom. In one aspect, in the hexagonal strontium ferrite powder, the divalent metal atom included in this powder can be only a strontium atom. In another aspect, the hexagonal strontium ferrite powder can also include one or more kinds of other divalent metal atoms, in addition to the strontium atom. For example, a barium atom and/or a calcium atom can be included. In a case where the other divalent metal atom other than the strontium atom is included, a content of a barium atom and a content of a calcium atom in the hexagonal strontium ferrite powder respectively can be, for example, 0.05 to 5.0 atom % with respect to 100 atom % of the iron atom.

As the crystal structure of the hexagonal ferrite, a magnetoplumbite type (also referred to as an "M type"), a W type, a Y type, and a Z type are known. The hexagonal strontium ferrite powder may have any crystal structure. The crystal structure can be confirmed by X-ray diffraction analysis. In the hexagonal strontium ferrite powder, a single crystal structure or two or more kinds of crystal structure can be detected by the X-ray diffraction analysis. For example, in one aspect, in the hexagonal strontium ferrite powder, only the M type crystal structure can be detected by the X-ray diffraction analysis. For example, the M type hexagonal ferrite is represented by a compositional formula of $AFe_{12}O_{19}$. Here, A represents a divalent metal atom, in a case where the hexagonal strontium ferrite powder has the M type, A is only a strontium atom (Sr), or in a case where a plurality of divalent metal atoms are included as A, the strontium atom (Sr) occupies the hexagonal strontium ferrite powder with the greatest content based on atom % as described above. A content of the divalent metal atom in the hexagonal strontium ferrite powder is generally determined according to the type of the crystal structure of the hexagonal ferrite and is not particularly limited. The same applies to a content of an iron atom and a content of an oxygen atom. The hexagonal strontium ferrite powder at least includes an iron atom, a strontium atom, and an oxygen atom, and can further include a rare earth atom. In addition, the hexagonal strontium ferrite powder may or may not include atoms other than these atoms. As an example the hexagonal strontium ferrite powder may include an aluminum atom (Al). A content of the aluminum atom can be, for example, 0.5 to 10.0 atom % with respect to 100 atom % of the iron atom. From a viewpoint of further preventing the reduction of the reproducing output during the repeated reproduction, the hexagonal strontium ferrite powder includes the iron atom, the strontium atom, the oxygen atom, and the rare earth atom, and a content of the atoms other than these atoms is preferably equal to or smaller than 10.0 atom %, more preferably 0 to 5.0 atom %, and may be 0 atom % with respect to 100 atom % of the iron atom. That is, in one aspect, the hexagonal strontium ferrite powder may not include atoms other than the iron atom, the strontium atom, the oxygen atom, and the rare earth atom. The content shown with atom % described above is obtained by converting a value of the content (unit: % by mass) of each atom obtained by totally dissolving the hexagonal strontium ferrite powder into a value shown as atom % by using the atomic weight of each atom. In addition, in the invention and the specification, a given atom which is "not included" means that the content thereof obtained by performing total dissolving and measurement by using an ICP analysis device is 0% by mass. A detection limit of the ICP analysis device is generally equal to or smaller than 0.01 ppm (parts per million) based on mass. The expression "not included" is used as a meaning including that a given atom is included with the amount smaller than the detection limit of the ICP analysis device. In one aspect, the hexagonal strontium ferrite powder does not include a bismuth atom (Bi).

Metal Powder

As a preferred specific example of the ferromagnetic powder, ferromagnetic metal powder can also be used. For details of the ferromagnetic metal powder, descriptions disclosed in paragraphs 0137 to 0141 of JP2011-216149A and paragraphs 0009 to 0023 of JP2005-251351A can be referred to, for example.

ε-Iron Oxide Powder

As a preferred specific example of the ferromagnetic powder, an ε-iron oxide powder can also be used. In the invention and the specification, the "ε-iron oxide powder" is a ferromagnetic powder having an ε-iron oxide type crystalline structure detected as a main phase by an X-ray diffraction analysis. For example, in a case where the diffraction peak of the highest hardness in the X-ray diffraction spectrum obtained by the X-ray diffraction analysis is belonged to the ε-iron oxide type crystalline structure, it is determined that the ε-iron oxide type crystalline structure is detected as a main phase. As a producing method of the ε-iron oxide powder, a producing method from a goethite, and a reverse micelle method are known. All of the producing methods is well known. For example, for a method of producing the ε-iron oxide powder in which a part of Fe is substituted with a substitutional atom such as Ga, Co, Ti, Al, or Rh, a description disclosed in J. Jpn. Soc. Powder Metallurgy Vol. 61 Supplement, No. S1, pp. S280-S284, J. Mater. Chem. C, 2013, 1, pp. 5200-5206 can be referred to, for example. However, the producing method of the ε-iron oxide powder which can be used as the ferromagnetic powder in the magnetic layer of the magnetic recording medium is not limited to the method described here.

An activation volume of the ε-iron oxide powder is preferably 300 to 1500 nm$^3$. The atomized ε-iron oxide powder showing the activation volume in the range described above is suitable for manufacturing a magnetic recording medium exhibiting excellent electromagnetic conversion characteristics. The activation volume of the ε-iron oxide powder is preferably equal to or greater than 300 nm$^3$, and can be, for example, equal to or greater than 500 nm$^3$. From a viewpoint of further improving electromagnetic conversion characteristics, the activation volume of the ε-iron oxide powder is preferably equal to or smaller than 1400 nm$^3$, more preferably equal to or smaller than 1300 nm$^3$, even more preferably equal to or smaller than 1200 nm$^3$, still preferably equal to or smaller than 1100 nm$^3$.

As an index of the reduction of thermal fluctuation, that is, improvement of thermal stability, the anisotropy constant Ku can be used. The ε-iron oxide powder can preferably have Ku equal to or greater than $3.0 \times 10^4$ J/m$^3$, and more preferably have Ku equal to or greater than $8.0 \times 10^4$ J/m$^3$. In addition, Ku of the ε-iron oxide powder can be, for example, equal to or smaller than $3.0 \times 10^5$ J/m$^3$. However, the high Ku is preferable, because it means high thermal stability, and thus, Ku is not limited to the exemplified value.

From a viewpoint of increasing reproducing output in a case of reproducing data recorded on a magnetic recording medium, it is desirable that the mass magnetization σs of the ferromagnetic powder included in the magnetic recording medium is high. In regards to this point, in one aspect, the σs of the ε-iron oxide powder can be equal to or greater than 8 A·m$^2$/kg and equal to or greater than 12 A·m$^2$/kg. On the other hand, from a viewpoint of noise reduction, the σs of the ε-iron oxide powder is preferably equal to or smaller than 40 A·m$^2$/kg and more preferably equal to or smaller than 35 A·m$^2$/kg.

In the invention and the specification, average particle sizes of various powder such as the ferromagnetic powder and the like are values measured by the following method with a transmission electron microscope, unless otherwise noted.

The powder is imaged at an imaging magnification ratio of 100,000 with a transmission electron microscope, the image is printed on photographic printing paper so that the total magnification ratio of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of a plurality of particles is not limited to an aspect in which particles configuring the aggregate directly come into contact with each other, but also includes an aspect in which a binding agent, an additive, or the like which will be described later is interposed between the particles. A term, particles may be used for representing the powder.

As a method of collecting a sample powder from the magnetic recording medium in order to measure the particle size, a method disclosed in a paragraph 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter. In a case of the definition (3), the average particle size is an average diameter (also referred to as an average particle diameter).

The content (filling percentage) of the ferromagnetic powder in the magnetic layer is preferably 50% to 90% by mass and more preferably 60% to 90% by mass. The components other than the ferromagnetic powder of the magnetic layer are at least a binding agent, and one or more kinds of additives may be randomly included. A high filling percentage of the ferromagnetic powder in the magnetic layer is preferable from a viewpoint of improvement of recording density.

Binding Agent and Curing Agent

The magnetic recording medium is a coating type magnetic recording medium and includes a binding agent in the magnetic layer. The binding agent is one or more kinds of resin. As the binding agent, various resins generally used as the binding agent of the coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be homopolymers or copolymers. These resins can be used as the binding agent even in the non-magnetic layer and/or a back coating layer which will be described later. For the binding agent described above, description disclosed in paragraphs 0028 to 0031 of JP2010-024113A can be referred to. In addition, the binding agent may be a radiation curable resin such as an electron beam curable resin. For the radiation curable resin, a description disclosed in paragraphs 0044 and 0045 of JP2011-048878A can be referred to.

An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC) under the following measurement conditions. The weight-average molecular weight of the binding agent shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In addition, a curing agent can also be used together with the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the manufacturing step of the magnetic recording medium.

The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of hardness of each layer such as the magnetic layer.

Other Components

The magnetic layer may include one or more kinds of additives, if necessary, together with various components described above. As the additives, a commercially available product can be suitably selected and used in accordance with the desired properties. In addition, a compound synthesized by a well-known method can be used as the additive. As an example of the additive, the curing agent is used. Examples of the additive which can be included in the magnetic layer include a non-magnetic filler, a lubricant, a dispersing agent, a dispersing assistant, an antibacterial agent, an antistatic agent, and an antioxidant. The non-magnetic filler is the same as non-magnetic particles or a non-magnetic powder. As the non-magnetic filler, a non-magnetic filler capable of functioning as a projection formation agent and an abrasive (hereinafter, also referred to as an "abrasive") can be used. In addition, as the additive, a well-known additive such as various polymer disclosed in paragraphs 0030 to 0080 of JP2016-051493A can be used.

As the projection formation agent which is one aspect of the non-magnetic filler, particles of inorganic substance can be used, particles of an organic substance can be used, and composite particles of the inorganic substance and the organic substance can also be used. Examples of the inorganic substance include inorganic oxide such as metal oxide, metal carbonate, metal sulfate, metal nitride, metal carbide, and metal sulfide, and inorganic oxide is preferable. In an embodiment, the projection agent can be inorganic oxide-based particles. Here, "-based" means "-containing". One aspect of the inorganic oxide-based particles is particles formed of inorganic oxide. In addition, the other aspect of the inorganic oxide-based particles is composite particles of inorganic oxide and organic substance, and as a specific example, composite particles of inorganic oxide and a polymer can be used. As such particles, particles obtained by binding a polymer to the surface of the inorganic oxide particles can be used, for example.

The $S_{0.5}$ can be controlled mainly according to a particle size of the projection formation agent. An average particle size of the projection formation agent is, for example, 30 to 300 nm and is preferably 40 to 200 nm. In addition, the $S_{0.5}$ can be mainly controlled in accordance with the manufacturing conditions of the magnetic recording medium. Meanwhile, the $S_{13.5}$ can be controlled in accordance with the shape of the projection formation agent, in addition to the particle size of the projection formation agent. As the shape of the particles is a shape close to a sphere, indentation resistance exerted during a large pressure is applied is small. Accordingly, the particles are easily pushed into the magnetic layer, and the $S_{13.5}$ is easily decreased. With respect to this, in a case where the shape of the particles is a shape other than the sphere, for example, a shape of a so-called deformed shape, a large indentation resistance is easily exerted, in a case where a large pressure is applied, and accordingly, particles are hardly pushed into the magnetic layer, and the $S_{13.5}$ is easily increased. In addition, regarding the particles having a low surface smoothness in which a surface of the particle is not even, the indentation resistance is easily exerted, in a case where a large pressure is applied, and accordingly, the particles are hardly pushed into the magnetic layer, and the $S_{13.5}$ is easily increased. By controlling the $S_{0.5}$ and $S_{13.5}$, the difference ($S_{0.5}-S_{13.5}$) can be equal to or smaller than 3.0 nm.

The abrasive which is the other aspect of the non-magnetic filler is preferably a non-magnetic powder having Mohs hardness exceeding 8, and more preferably a non-magnetic powder having Mohs hardness equal to or greater than 9. With respect to this, the Mohs hardness of the projection formation agent can be, for example, equal to or smaller than 8 or equal to or smaller than 7. A maximum value of Mohs hardness is 10 of diamond. Specifically, examples thereof include powders of alumina ($Al_2O_3$), silicon carbide, boron carbide ($B_4C$), $SiO_2$, TiC, chromium oxide ($Cr_2O_3$), cerium oxide, zirconium oxide ($ZrO_2$), iron oxide, or diamond, and among these, alumina powder such as α-alumina and silicon carbide powder are preferable. An average particle size of the abrasive is, for example, 30 to 300 nm, and preferably 50 to 200 nm.

From a viewpoint of causing the projection formation agent and the abrasive to exhibit these functions in more excellent manner, a content of the projection formation agent in the magnetic layer is preferably 1.0 to 4.0 parts by mass and more preferably 1.5 to 3.5 parts by mass, with respect to 100.0 parts by mass of the ferromagnetic powder.

Meanwhile, a content of the abrasive in the magnetic layer is preferably 1.0 to 20.0 parts by mass, more preferably 3.0 to 15.0 parts by mass, and even more preferably 4.0 to 10.0 parts by mass, with respect to 100.0 parts by mass of the ferromagnetic powder.

As an example of the additive which can be used in the magnetic layer including the abrasive, a dispersing agent disclosed in paragraphs 0012 to 0022 of JP2013-131285A can be used as a dispersing agent for improving dispersibility of the abrasive in the magnetic layer forming composition. For the dispersing agent, a description disclosed in paragraphs 0061 and 0071 of JP2012-133837A can be referred to. The dispersing agent may be included in the non-magnetic layer. For the dispersing agent which may be included in the non-magnetic layer, a description disclosed in a paragraph 0061 of JP2012-133837A can be referred to.

As the lubricant which is one aspect of the additive which can be included in the magnetic layer, one kind or more of lubricant selected from the group consisting of fatty acid, fatty acid ester, and fatty acid amide can be used. The $S_{0.5}$–$S_{13.5}$ are values measured after the n-hexane cleaning. In a case where a liquid film of the lubricant is present on the surface of the magnetic layer pressed during the spacing measurement, the spacing to be measured may be narrowed, by a thickness of this liquid film. With respect to this, it is surmised that the lubricant which can be present as the liquid film during the pressing can be removed by the n-hexane cleaning. Accordingly, it is thought that, by measuring the spacing after the n-hexane cleaning, it is possible to obtain a measurement value of the spacing as a value corresponding to a presence state of the projection on the surface of the magnetic layer (height of projection).

Examples of fatty acid include lauric acid, myristic acid, palmitic acid, stearic acid, oleic acid, linoleic acid, linolenic acid, behenic acid, erucic acid, and elaidic acid, stearic acid, myristic acid, and palmitic acid are preferable, and stearic acid is more preferable. Fatty acid may be included in the magnetic layer in a state of salt such as metal salt.

As fatty acid ester, esters of lauric acid, myristic acid, palmitic acid, stearic acid, oleic acid, linoleic acid, linolenic acid, behenic acid, erucic acid, and elaidic acid can be used, for example. Specific examples thereof include butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

As fatty acid amide, amide of various fatty acid described above is used, and examples thereof include lauric acid amide, myristic acid amide, palmitic acid amide, and stearic acid amide.

Regarding fatty acid and a derivative of fatty acid (amide and ester), a fatty acid-derived part of the fatty acid derivative preferably has the same or similar structure as that of fatty acid used in combination. For example, as an example, it is preferable to use stearic acid ester and/or stearic acid amide, in a case of using stearic acid as the fatty acid.

A content of fatty acid in the magnetic layer forming composition is, for example, 0 to 10.0 parts by mass, preferably 0.1 to 10.0 parts by mass, and more preferably 1.0 to 7.0 parts by mass with respect to 100.0 parts by mass of ferromagnetic powder. A content of fatty acid ester in the magnetic layer forming composition is, for example, 0 to 10.0 parts by mass, preferably 0.1 to 10.0 parts by mass, and more preferably 1.0 to 7.0 parts by mass with respect to 100.0 parts by mass of ferromagnetic powder. A content of fatty acid amide in the magnetic layer forming composition is, for example, 0 to 3.0 parts by mass, preferably 0 to 2.0 parts by mass, and more preferably 0 to 1.0 part by mass with respect to 100.0 parts by mass of ferromagnetic powder.

In a case where the magnetic recording medium includes a non-magnetic layer between the non-magnetic support and the magnetic layer, the content of fatty acid in a non-magnetic layer forming composition is, for example, 0 to 10.0 parts by mass, preferably 1.0 to 10.0 parts by mass, and more preferably 1.0 to 7.0 parts by mass with respect to 100.0 parts by mass of the non-magnetic powder. The content of fatty acid ester in the non-magnetic layer forming composition is, for example, 0 to 15.0 parts by mass and preferably 0.1 to 10.0 parts by mass with respect to 100.0 parts by mass of the non-magnetic powder. The content of fatty acid amide in the non-magnetic layer forming composition is, for example, 0 to 3.0 parts by mass and preferably 0 to 1.0 part by mass with respect to 100.0 parts by mass of the non-magnetic powder.

Non-Magnetic Layer

Next, the non-magnetic layer will be described. The magnetic recording medium may include a magnetic layer directly on the non-magnetic support or may include a non-magnetic layer including the non-magnetic powder and the binding agent between the non-magnetic support and the magnetic layer. The non-magnetic powder used in the non-magnetic layer may be a powder of an inorganic substance (inorganic powder) or a powder of an organic substance (organic powder). In addition, carbon black and the like can be used. Examples of the inorganic substance include metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, a description of paragraphs 0040 and 0041 of JP2010-024113A can be referred to. The content (filling percentage) of the non-magnetic powder of the non-magnetic layer is preferably 50% to 90% by mass and more preferably 60% to 90% by mass.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the magnetic recording medium also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Non-Magnetic Support

Next, the non-magnetic support will be described. As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heating process may be performed with respect to these supports in advance.

In an embodiment, the non-magnetic support of the magnetic recording medium can be an aromatic polyester support. In the invention and the specification, "aromatic polyester" means a resin including an aromatic skeleton and a plurality of ester bonds, and the "aromatic polyester support" means a support including at least one layer of an aromatic polyester film. The "aromatic polyester film" is a film in which the largest component in the component configuring this film based on mass is aromatic polyester. The "aromatic polyester support" of the invention and the specification include a support in which all of resin films included in this support is the aromatic polyester film and a support including the aromatic polyester film and the other resin film. Specific examples of the aromatic polyester support include a single aromatic polyester film, a laminated film of two or more layers of the aromatic polyester film having the same constituting component, a laminated film of two or more layers of the aromatic polyester film having different constituting components, and a laminated film including one or more layers of the aromatic polyester film and one or more layers of resin film other than the aromatic polyester. In the laminated film, an adhesive layer or the like may be randomly included between two adjacent layers. In addition, the aromatic polyester support may randomly include a metal film and/or a metal oxide film formed by performing vapor deposition or the like on one or both surfaces.

An aromatic ring included in an aromatic skeleton including the aromatic polyester is not particularly limited. Specific examples of the aromatic ring include a benzene ring and naphthalene ring.

For example, polyethylene terephthalate (PET) is polyester including a benzene ring, and is a resin obtained by polycondensation of ethylene glycol and terephthalic acid and/or dimethyl terephthalate. The "polyethylene terephthalate" of the invention and the specification include polyethylene terephthalate having a structure including one or more kinds of other components (for example, copolymerization component, and component introduced to a terminal or a side chain), in addition to the component described above. Hereinafter, the aromatic polyester film including polyethylene terephthalate as the aromatic polyester is referred to as a polyethylene terephthalate film.

Polyethylene naphthalate (PEN) is polyester including a naphthalene ring, and is a resin obtained by performing esterification reaction of dimethyl 2,6-naphthalenedicarboxylate and ethylene glycol, and then, transesterification and polycondensation reaction. The "polyethylene naphthalate" of the invention and the specification include polyethylene naphthalate having a structure including one or more kinds of other components (for example, copolymerization component, and component introduced to a terminal or a side chain), in addition to the component described above. Hereinafter, the aromatic polyester film including polyethylene naphthalate as the aromatic polyester is referred to as a polyethylene naphthalate film.

In addition, the aromatic polyester support can be a biaxial stretching film, and may be a film subjected to corona discharge, plasma treatment, easy adhesion treatment, or heat treatment.

However, according to the studies of the inventors, regarding the magnetic recording medium including the aromatic polyester support as the non-magnetic support, a tendency in which the aromatic polyester support having a high Young's modulus is preferable is found, from a viewpoint of further preventing an increase in coefficient of friction, even in a case where the sliding with the magnetic head is repeated in an environment of a higher temperature. It is surmised that, in the environment of a higher temperature, a rigidity of the aromatic polyester support greatly affects the contact state of the surface of the magnetic layer and the magnetic head. However, the invention is not limited to such a surmise. From the viewpoint described above, in the tape-shaped magnetic recording medium (magnetic tape) including the aromatic polyester support as the non-magnetic support, a Young's modulus of the aromatic polyester support is preferably equal to or greater than 3000 N/mm$^2$ in a longitudinal direction and preferably 4000 N/mm$^2$ in a width direction. The Young's modulus of the aromatic polyester support is more preferably equal to or greater than 4000 N/mm$^2$ in a longitudinal direction and more preferably 5000 N/mm$^2$ in a width direction. The Young's modulus of the aromatic polyester support is even more preferably equal to or greater than 5000 N/mm$^2$ in a longitudinal direction and even more preferably 6000 N/mm$^2$ in a width direction. In addition, it is preferable to use the aromatic polyester support having a high Young's modulus as the non-magnetic support of the magnetic recording medium, from a viewpoint of preventing deformation of the magnetic recording medium after a long-term use. For example, it is preferable that the magnetic tape includes the aromatic polyester support having a high Young's modulus, from a viewpoint of preventing deformation of the magnetic tape in a tape width direction after a long-term use. The Young's modulus of the aromatic polyester support can be, for example, 12000 N/mm$^2$ in a longitudinal direction and can be 15000 N/mm$^2$ in a width direction. However, for example, it is preferable that the Young's modulus of the aromatic polyester support is high, from a viewpoint of preventing the deformation after a long-term use, and accordingly, the Young's modulus of the aromatic polyester support in a longitudinal direction and the Young's modulus thereof in a width direction may be greater than the value exemplified above. The Young's modulus of the aromatic polyester support can be controlled in accordance with the kind and a mixing ratio of the components configuring the support, and the manufacturing conditions of the support. For example, by adjusting a stretching ratio in each direction in the biaxial stretching process, the Young's modulus in a longitudinal direction and the Young's modulus in a width direction can be respectively controlled.

In the invention and the specification, the Young's modulus of the aromatic polyester support is a value measured by the following method in a measurement environment of a temperature of 23° C. and relative humidity of 50%.

A sample piece cut from a support which is a measurement target is pulled by a universal tensile testing device under conditions of a distance between chucks of 100 mm, a tensile rate of 10 mm/min, and a chart rate of 500 mm/min. As the universal tensile testing device, for example, a commercially available universal tensile testing device such as TENSILON manufactured by Baldwin Corporation or a universal tensile testing device having a well-known configuration can be used. The Young's modulus of the sample piece in a longitudinal direction and a width direction are respectively calculated by a tangent of a rising part of a load-elongation curve obtained as described above. Here, the longitudinal direction and the width direction of the sample piece means a longitudinal direction and a width direction, in a case where this sample piece is included in the magnetic tape.

For example, after removing the portion such as the magnetic layer other than the aromatic polyester support from the magnetic tape by a well-known method (for example, coating removing using an organic solvent), the Young's modulus of the aromatic polyester support in the longitudinal direction and the width direction can be obtained by the method described above.

Back Coating Layer

The magnetic recording medium can also include a back coating layer including a non-magnetic powder and a binding agent on a surface of the non-magnetic support opposite to the surface provided with the magnetic layer. The back coating layer preferably includes any one or both of carbon black and inorganic powder. In regards to the binding agent included in the back coating layer and various additives which can be randomly included therein, a well-known technology regarding the back coating layer can be applied, and a well-known technology regarding the list of the magnetic layer and/or the non-magnetic layer can also be applied. For example, for the back coating layer, descriptions disclosed in paragraphs 0018 to 0020 of JP2006-331625A and page 4, line 65, to page 5, line 38, of U.S. Pat. No. 7,029,774B can be referred to.

Various Thicknesses A thickness of the non-magnetic support is, for example, 3.0 to 80.0 μm, preferably 3.0 to 50.0 μm, and more preferably 3.0 to 10.0 μm.

A thickness of the magnetic layer is preferably equal to or smaller than 100 nm, from a viewpoint of realizing high-density recording that is recently required. The thickness of the magnetic layer is more preferably 10 nm to 100 nm and even more preferably 20 to 90 nm. The magnetic layer may be at least one layer, or the magnetic layer can be separated to two or more layers having different magnetic properties, and a configuration regarding a well-known multilayered magnetic layer can be applied. A thickness of the magnetic layer which is separated into two or more layers is a total thickness of the layers.

A thickness of the non-magnetic layer is, for example, 0.1 to 1.5 μm and preferably 0.1 to 1.0 μm.

A thickness of the back coating layer is preferably equal to or smaller than 0.9 μm and even more preferably 0.1 to 0.7 μm.

The thicknesses of various layers and the non-magnetic support of the magnetic recording medium can be obtained by a well-known film thickness measurement method. As an example, a cross section of the magnetic recording medium in a thickness direction is exposed by a well-known method of ion beams or microtome, and the exposed cross section is observed with a scanning electron microscope. In the cross section observation, various thicknesses can be obtained as the thickness obtained at one portion, or as an arithmetical mean of thicknesses obtained at a plurality of portions which are two or more portions randomly extracted, for example, two portions. Alternatively, the thickness of each layer may be obtained as a designed thickness calculated under the manufacturing conditions.

Manufacturing Method

Preparation of Each Layer Forming Composition

Composition for forming the magnetic layer, the non-magnetic layer, or the back coating layer generally includes a solvent, together with the various components described above. As the solvent, various organic solvent generally used for manufacturing a coating type magnetic recording medium can be used. Among these, from a viewpoint of solubility of the binding agent normally used in the coating type magnetic recording medium, one or more kinds of a ketone solvent such as acetone, methyl ethyl ketone, methyl isobutyl ketone, diisobutyl ketone, cyclohexanone, isophorone, and tetrahydrofuran is preferably included in each layer forming composition. The amount of solvent in each layer forming composition is not particularly limited, and can be identical to that in each layer forming composition of a typical coating type magnetic recording medium.

In addition, a step of preparing each layer forming composition can include at least a kneading step, a dispersing step, and a mixing step provided before and after these steps, if necessary. Each step may be divided into two or more stages. The component used in the preparation of each layer forming composition may be added at an initial stage or in a middle stage of each step. In addition, each component may be separately added in two or more steps. For example, the binding agent may be separately put in the kneading step, the dispersing step, and the mixing step for adjusting a viscosity after the dispersion. In the manufacturing step of the magnetic recording medium, a well-known manufacturing technology of the related art can be used in a part or all of the steps. In the kneading step, an open kneader, a continuous kneader, a pressure kneader, or a kneader having a strong kneading force such as an extruder is preferably used. For details of the kneading processes, descriptions disclosed in JP1989-106338A (JP-H01-106338A) and JP1989-079274A (JP-H01-079274A) can be referred to. In addition, in order to disperse each layer forming composition, glass beads and/or other beads can be used. As such dispersion beads, zirconia beads, titania beads, and steel beads which are dispersion beads having high specific gravity are suitable. These dispersion beads are preferably used by optimizing a particle diameter (bead diameter) and a filling percentage. As a disperser, a well-known disperser can be used. Each layer forming composition may be filtered by a well-known method before performing the coating step. The filtering can be performed by using a filter, for example. As the filter used in the filtering, a filter having a hole diameter of 0.01 to 3 μm (for example, filter made of glass fiber or filter made of polypropylene) can be used, for example.

Coating Step

The magnetic layer can be formed, for example, by directly applying the magnetic layer forming composition onto the non-magnetic support or performing multilayer coating of the magnetic layer forming composition with the non-magnetic layer forming composition in order or at the same time. In an aspect of performing an alignment process, while the coating layer of the magnetic layer forming composition is wet, the alignment process is performed with respect to the coating layer in an alignment zone. For the alignment process, various technologies disclosed in a paragraph 0052 of JP2010-024113A can be applied. For example, a homeotropic alignment process can be performed by a well-known method such as a method using a different polar facing magnet. In the alignment zone, a drying speed of the coating layer can be controlled by a temperature, an air flow of the dry air and/or a transporting rate in the alignment zone. In addition, the coating layer may be preliminarily dried before transporting to the alignment zone.

The back coating layer can be formed by applying the back coating layer forming composition to a side of the non-magnetic support opposite to a side provided with the magnetic layer (or to be provided with the magnetic layer).

For details of the coating for forming each layer, a description disclosed in a paragraph 0066 of JP2010-231843A can be referred to.

Other Steps

After performing the coating step, a calender process is normally performed for increasing a surface smoothness of the magnetic recording medium. As the calender conditions are reinforced, a height of the projection on the surface of the magnetic layer formed by the projection formation agent tends to decrease in the manufactured magnetic recording medium. Accordingly, for example, the $S_{0.5}$ can be decreased. As the calender condition, the kind and the number of steps of a calender roll, a calender pressure, a calender temperature (surface treatment of a calender roll), and a calender speed can be used. The calender pressure is, for example, 200 to 500 kN/m and preferably 250 to 350 kN/m, the calender temperature is, for example, 70° C. to 120° C. and preferably 80° C. to 100° C., and the calender speed is, for example, 50 to 300 m/min and preferably 80 to 200 m/min. In addition, as a hard roll is used on the surface as the calender roll or as the number of steps is increased, the surface of the magnetic layer tends to be smoothened, and accordingly, the height of the projection on the surface of the magnetic layer can also be adjusted by the combination and the number of steps of the calender rolls.

For other various steps for manufacturing the magnetic recording medium, a description disclosed in paragraphs 0067 to 0070 of JP2010-231843A can be referred to.

The magnetic recording medium according to one aspect of the invention described above can be, for example, a tape-shaped magnetic recording medium (magnetic tape). The magnetic tape is normally used to be accommodated and circulated in a magnetic tape cartridge. The recording and reproducing of information on the magnetic tape can be performed by mounting the magnetic tape cartridge on the magnetic recording and reproducing device and causing the magnetic tape to run in the magnetic recording and reproducing device to cause a contact between the surface of the magnetic tape (surface of magnetic layer) and magnetic head to slide thereon. However, the magnetic recording medium according to the one aspect of the invention is not limited to the magnetic tape. As various magnetic recording media (magnetic tape, disk-shaped magnetic recording medium (magnetic disk) and the like) used in a sliding type magnetic recording and reproducing device, the magnetic recording medium according to the one aspect of the invention is suitable. The sliding type device is a device in which the surface of the magnetic layer and the magnetic head are in contact with each other and slide, in a case of performing recording of information on the magnetic recording medium and/or reproducing of the recorded information.

A servo pattern can be formed on the magnetic recording medium manufactured as described above by a well-known method, in order to realize tracking control of a magnetic head of the magnetic recording and reproducing device and control of a running speed of the magnetic recording medium. The "formation of the servo pattern" can be "recording of a servo signal". The magnetic recording medium may be a tape-shaped magnetic recording medium (magnetic tape) or a disk-shaped magnetic recording medium (magnetic disk). Hereinafter, the formation of the servo pattern will be described using a magnetic tape as an example.

The servo pattern is generally formed along a longitudinal direction of the magnetic tape. As a method of control using a servo signal (servo control), timing-based servo (TBS), amplitude servo, or frequency servo is used.

As shown in European Computer Manufacturers Association (ECMA)-319, a timing-based servo system is used in a magnetic tape based on a linear tape-open (LTO) standard (generally referred to as an "LTO tape"). In this timing-based servo system, the servo pattern is configured by continuously disposing a plurality of pairs of magnetic stripes (also referred to as "servo stripes") not parallel to each other in a longitudinal direction of the magnetic tape. As described above, a reason for that the servo pattern is configured with one pair of magnetic stripes not parallel to each other is because a servo signal reading element passing on the servo pattern recognizes a passage position thereof. Specifically, one pair of the magnetic stripes are formed so that a gap thereof is continuously changed along the width direction of the magnetic tape, and a relative position of the servo pattern and the servo signal reading element can be recognized, by the reading of the gap thereof by the servo signal reading element. The information of this relative position can realize the tracking of a data track. Accordingly, a plurality of servo tracks are generally set on the servo pattern along the width direction of the magnetic tape.

The servo band is configured of a servo signal continuous in the longitudinal direction of the magnetic tape. A plurality of servo bands are normally provided on the magnetic tape. For example, the number thereof is 5 in the LTO tape. A region interposed between two adjacent servo bands is called a data band. The data band is configured of a plurality of data tracks and each data track corresponds to each servo track.

In one aspect, as shown in JP2004-318983A, information showing the number of servo band (also referred to as "servo band identification (ID)" or "Unique Data Band Identification Method (UDIM) information") is embedded in each servo band. This servo band ID is recorded by shifting a specific servo stripe among the plurality of pair of servo stripes in the servo band so that the position thereof is relatively deviated in the longitudinal direction of the magnetic tape. Specifically, the position of the shifted specific servo stripe among the plurality of pair of servo stripes is changed for each servo band. Accordingly, the recorded servo band ID becomes unique for each servo band, and therefore, the servo band can be uniquely specified by only reading one servo band by the servo signal reading element.

In a method of uniquely specifying the servo band, a staggered method as shown in ECMA-319 is used. In this staggered method, the group of one pair of magnetic stripes (servo stripe) not parallel to each other which are continuously disposed in the longitudinal direction of the magnetic tape is recorded so as to be shifted in the longitudinal direction of the magnetic tape for each servo band. A combination of this shifted servo band between the adjacent servo bands is set to be unique in the entire magnetic tape, and accordingly, the servo band can also be uniquely specified by reading of the servo pattern by two servo signal reading elements.

In addition, as shown in ECMA-319, information showing the position in the longitudinal direction of the magnetic tape (also referred to as "Longitudinal Position (LPOS) information") is normally embedded in each servo band. This LPOS information is recorded so that the position of one pair of servo stripes are shifted in the longitudinal direction of the magnetic tape, in the same manner as the UDIM information. However, unlike the UDIM information, the same signal is recorded on each servo band in this LPOS information.

Other information different from the UDIM information and the LPOS information can be embedded in the servo band. In this case, the embedded information may be different for each servo band as the UDIM information, or may be common in all of the servo bands, as the LPOS information.

In addition, as a method of embedding the information in the servo band, a method other than the method described above can be used. For example, a predetermined code may be recorded by thinning out a predetermined pair among the group of pairs of the servo stripes.

A servo pattern forming head is also referred to as a servo write head. The servo write head includes pairs of gaps corresponding to the pairs of magnetic stripes by the number of servo bands. In general, a core and a coil are respectively connected to each of the pairs of gaps, and a magnetic field generated in the core can generate leakage magnetic field in the pairs of gaps, by supplying a current pulse to the coil. In a case of forming the servo pattern, by inputting a current pulse while causing the magnetic tape to run on the servo write head, the magnetic pattern corresponding to the pair of gaps is transferred to the magnetic tape, and the servo pattern can be formed. A width of each gap can be suitably set in accordance with a density of the servo patterns to be formed. The width of each gap can be set as, for example, equal to or smaller than 1 µm, 1 to 10 µm, or equal to or greater than 10 µm.

Before forming the servo pattern on the magnetic tape, a demagnetization (erasing) process is generally performed on the magnetic tape. This erasing process can be performed by applying a uniform magnetic field to the magnetic tape by using a DC magnet and an AC magnet. The erasing process includes direct current (DC) erasing and alternating current (AC) erasing. The AC erasing is performed by slowing decreasing an intensity of the magnetic field, while reversing a direction of the magnetic field applied to the magnetic tape. Meanwhile, the DC erasing is performed by adding the magnetic field in one direction to the magnetic tape. The DC erasing further includes two methods. A first method is horizontal DC erasing of applying the magnetic field in one direction along a longitudinal direction of the magnetic tape. A second method is vertical DC erasing of applying the magnetic field in one direction along a thickness direction of the magnetic tape. The erasing process may be performed with respect to all of the magnetic tape or may be performed for each servo band of the magnetic tape.

A direction of the magnetic field to the servo pattern to be formed is determined in accordance with the direction of erasing. For example, in a case where the vertical DC erasing is performed to the magnetic tape, the formation of the servo pattern is performed so that the direction of the magnetic field and the direction of erasing becomes opposite to each other. Accordingly, the output of the servo signal obtained by the reading of the servo pattern can be increased. As disclosed in JP2012-053940A, in a case where the magnetic pattern is transferred to the magnetic tape subjected to the vertical DC erasing by using the gap, the servo signal obtained by the reading of the formed servo pattern has a unipolar pulse shape. Meanwhile, in a case where the magnetic pattern is transferred to the magnetic tape subjected to the horizontal DC erasing by using the gap, the servo signal obtained by the reading of the formed servo pattern has a bipolar pulse shape.

Magnetic Recording and Reproducing Device

One aspect of the invention relates to a magnetic recording and reproducing device including the magnetic recording medium and a magnetic head.

In the invention and the specification, the "magnetic recording and reproducing device" means a device capable of performing at least one of the recording of data on the magnetic recording medium or the reproducing of data recorded on the magnetic recording medium. Such a device is generally called a drive. The magnetic recording and reproducing device can be a sliding type magnetic recording and reproducing device. The sliding type magnetic recording and reproducing device is a device in which a surface of a magnetic layer and a magnetic head are in contact with each other and slide on each other, in a case of performing the recording of data on a magnetic recording medium and/or the reproducing of the recorded data.

The magnetic head included in the magnetic recording and reproducing device can be a recording head capable of performing the recording of data on the magnetic recording medium, and can also be a reproducing head capable of performing the reproducing of data recorded on the magnetic recording medium. In addition, in the aspect, the magnetic recording and reproducing device can include both of a recording head and a reproducing head as separate magnetic heads. In another aspect, the magnetic head included in the magnetic recording and reproducing device can also have a configuration of comprising both of an element for recording data (recording element) and an element for reproducing data (reproducing element) in one magnetic head. Hereinafter, the element for recording data and the element for reproducing are collectively referred to as "elements for data". As the reproducing head, a magnetic head (MR head) including a magnetoresistive (MR) element capable of reading data recorded on the magnetic tape with excellent sensitivity as the reproducing element is preferable. As the MR head, various well-known MR heads such as an Anisotropic Magnetoresistive (AMR) head, a Giant Magnetoresistive (GMR) head, or a Tunnel Magnetoresistive (TMR) can be used. In addition, the magnetic head which performs the recording of data and/or the reproducing of data may include a servo reading element. Alternatively, as a head other than the magnetic head which performs the recording of data and/or the reproducing of data, a magnetic head (servo head) comprising a servo reading element may be included in the magnetic recording and reproducing device. The magnetic head which performs the recording of data and/or reproducing of the recorded data (hereinafter, also referred to as a "recording and reproducing head") can include two servo signal reading elements, and each of the two servo signal reading elements can read two adjacent servo bands at the same time. One or a plurality of elements for data can be disposed between the two servo signal reading elements.

In the magnetic recording and reproducing device, the recording of data on the magnetic recording medium and/or the reproducing of data recorded on the magnetic recording medium can be performed by bringing the surface of the magnetic layer of the magnetic recording medium into contact with the magnetic head and sliding. The magnetic recording and reproducing device may include the magnetic recording medium according to the aspect of the invention, and well-known technologies can be applied for the other configurations.

For example, in a case of the recording of data on the magnetic recording medium on which the servo pattern is formed and/or the reproducing of the recorded data, first, the tracking is performed by using the servo signal obtained by the reading of the servo pattern. That is, as the servo signal reading element follows a predetermined servo track, the element for data is controlled to pass on the target data track.

The movement of the data track is performed by changing the servo track to be read by the servo signal reading element in the tape width direction.

In addition, the recording and reproducing head can perform the reading and/or the reproducing with respect to other data bands. In this case, the servo signal reading element is moved to a predetermined servo band by using the UDIM information described above, and the tracking with respect to the servo band may be started.

EXAMPLES

Hereinafter, the invention will be described with reference to examples. However, the invention is not limited to aspects shown in the examples. "Parts" in the following description mean "parts by mass". In addition, steps and evaluations described below are performed in an environment of an atmosphere temperature of 23° C.±1° C., unless otherwise noted. "eq" described below indicates equivalent and a unit not convertible into SI unit.

A projection formation agent used for manufacturing magnetic recording media of examples or comparative examples is as follows. A projection formation agent 1 and a projection formation agent 3 are particles having a low surface smoothness of a surface of particles. A particle shape of the projection formation agent 2 is a shape of a cocoon. A particle shape of the projection formation agent 4 is a so-called indeterminate shape. A particle shape of the projection formation agent 5 is a shape closer to a sphere.

Projection formation agent 1: ATLAS (composite particles of silica and polymer) manufactured by Cabot Corporation, average particle size: 100 nm Projection formation agent 2: TGC6020N (silica particles) manufactured by Cabot Corporation, average particle size: 140 nm Projection formation agent 3: Cataloid (water dispersed sol of silica particles; as a projection formation agent for preparing a projection formation agent solution which will be described later, a dried solid material obtained by removing the solvent by heating the water dispersed sol described above is used) manufactured by JGC c&c, average particle size: 120 nm Projection formation agent 4: ASAHI #50 (carbon black) manufactured by Asahi Carbon Co., Ltd., average particle size: 300 nm Projection formation agent 5: PL-10L (water dispersed sol of silica particles; as a projection formation agent for preparing a projection formation agent solution which will be described later, a dried solid material obtained by removing the solvent by heating the water dispersed sol described above is used) manufactured by FUSO CHEMICAL CO., LTD., average particle size: 130 nm In Table 1, "BaFe" is hexagonal barium ferrite powder (coercivity Hc: 196 kA/m, average particle size (average plate diameter): 24 nm).

In Table 1, "SrFe1" is hexagonal strontium ferrite powder prepared by the method described below.

1707 g of $SrCO_3$, 687 g of $H_3BO_3$, 1120 g of $Fe_2O_3$, 45 g of $Al(OH)_3$, 24 g of $BaCO_3$, 13 g of $CaCO_3$, and 235 g of $Nd_2O_3$ were weighed and mixed in a mixer to obtain a raw material mixture.

The obtained raw material mixture was dissolved in a platinum crucible at a dissolving temperature of 1390° C., and a tap hole provided on the bottom of the platinum crucible was heated while stirring the dissolved liquid, and the dissolved liquid was tapped in a rod shape at approximately 6 g/sec. The tap liquid was rolled and cooled with a water cooling twin roller to prepare an amorphous body.

280 g of the prepared amorphous body was put into an electronic furnace, heated to 635° C. (crystallization temperature) at a rate of temperature rise of 3.5° C./min, and held at the same temperature for 5 hours, and hexagonal strontium ferrite particles were precipitated (crystallized).

Then, the crystallized material obtained as described above including the hexagonal strontium ferrite particles was coarse-pulverized with a mortar, 1000 g of zirconia beads having a particle diameter of 1 mm and 800 ml of an acetic acid aqueous solution having a concentration of 1% were added to a glass bottle, and a dispersion process was performed in a paint shaker for 3 hours. After that, the obtained dispersion liquid and the beads were dispersed and put in a stainless still beaker. The dispersion liquid was left at a liquid temperature of 100° C. for 3 hours, subjected to a dissolving process of a glass component, precipitated with a centrifugal separator, decantation was repeated for cleaning, and drying was performed in a heating furnace at a furnace inner temperature of 110° C. for 6 hours, to obtain hexagonal strontium ferrite powder.

Regarding the hexagonal strontium ferrite powder obtained as described above, an average particle size was 18 nm, an activation volume was 902 $nm^3$, an anisotropy constant Ku was $2.2 \times 10^5$ $J/m^3$, and a mass magnetization as was 49 $A \cdot m^2/kg$.

12 mg of a sample powder was collected from the hexagonal strontium ferrite powder obtained as described above, the element analysis of a filtrate obtained by the partial dissolving of this sample powder under the dissolving conditions described above was performed by the ICP analysis device, and a surface layer portion content of a neodymium atom was obtained.

Separately, 12 mg of a sample powder was collected from the hexagonal strontium ferrite powder obtained as described above, the element analysis of a filtrate obtained by the total dissolving of this sample powder under the dissolving conditions described above was performed by the ICP analysis device, and a bulk content of a neodymium atom was obtained.

The content (bulk content) of the neodymium atom in the hexagonal strontium ferrite powder obtained as described above with respect to 100 atom % of iron atom was 2.9 atom %. In addition, the surface portion content of the neodymium atom was 8.0 atom %. A ratio of the surface portion content and the bulk content, "surface portion content/bulk content" was 2.8 and it was confirmed that the neodymium atom is unevenly distributed on the surface layer of the particles.

A crystal structure of the hexagonal ferrite shown by the powder obtained as described above was confirmed by scanning CuKα ray under the condition of a voltage of 45 kV and intensity of 40 mA and measuring an X-ray diffraction pattern under the following conditions (X-ray diffraction analysis). The powder obtained as described above showed a crystal structure of magnetoplumbite type (M type) hexagonal ferrite. In addition, a crystal phase detected by the X-ray diffraction analysis was a magnetoplumbite type single phase.

PANalytical X'Pert Pro diffractometer, PIXcel detector
Soller slit of incident beam and diffraction beam: 0.017 radians
Fixed angle of dispersion slit: ¼ degrees
Mask: 10 mm
Scattering prevention slit: ¼ degrees
Measurement mode: continuous
Measurement time per 1 stage: 3 seconds
Measurement speed: 0.017 degrees per second
Measurement step: 0.05 degrees In Table 1, "SrFe2" is hexagonal strontium ferrite powder prepared by the following method. 1725 g of $SrCO_3$, 666 g of $H_3BO_3$, 1332 g of $Fe_2O_3$, 52 g of $Al(OH)_3$, 34 g of $CaCO_3$, and 141 g of $BaCO_3$ were weighed and mixed in a mixer to obtain a raw material mixture.

The obtained raw material mixture was dissolved in a platinum crucible at a dissolving temperature of 1380° C., and a tap hole provided on the bottom of the platinum crucible was heated while stirring the dissolved liquid, and the dissolved liquid was tapped in a rod shape at approximately 6 g/sec. The tap liquid was cooled and rolled with a water cooling twin roll to prepare an amorphous body.

280 g of the obtained amorphous body was put into an electronic furnace, heated to 645° C. (crystallization temperature), and held at the same temperature for 5 hours, and hexagonal strontium ferrite particles were precipitated (crystallized).

Then, the crystallized material obtained as described above including the hexagonal strontium ferrite particles was coarse-pulverized with a mortar, 1000 g of zirconia beads having a particle diameter of 1 mm and 800 ml of an acetic acid aqueous solution having a concentration of 1% were added to a glass bottle, and a dispersion process was performed in a paint shaker for 3 hours. After that, the obtained dispersion liquid and the beads were dispersed and put in a stainless still beaker. The dispersion liquid was left at a liquid temperature of 100° C. for 3 hours, subjected to a dissolving process of a glass component, precipitated with a centrifugal separator, decantation was repeated for cleaning, and drying was performed in a heating furnace at a furnace inner temperature of 110° C. for 6 hours, to obtain hexagonal strontium ferrite powder.

Regarding the hexagonal strontium ferrite powder obtained as described above, an average particle size was 19 nm, an activation volume was 1102 $nm^3$, an anisotropy constant Ku was $2.0 \times 10^5$ $J/m^3$, and a mass magnetization σs was 50 $A \cdot m^2/kg$.

In Table 1, "ε-iron oxide" is ε-iron oxide powder prepared by the following method. 4.0 g of ammonia aqueous solution having a concentration of 25% was added to a material obtained by dissolving 8.3 g of iron (III) nitrate nonahydrate, 1.3 g of gallium (III) nitrate octahydrate, 190 mg of cobalt (II) nitrate hexahydrate, 150 mg of titanium (IV) sulfate, and 1.5 g of polyvinyl pyrrolidone (PVP) in 90 g of pure water, while stirring by using a magnetic stirrer, in an atmosphere under the conditions of an atmosphere temperature of 25° C., and the mixture was stirred for 2 hours still under the temperature condition of the atmosphere temperature of 25° C. A citric acid solution obtained by dissolving 1 g of citric acid in 9 g of pure water was added to the obtained solution and stirred for 1 hour. The powder precipitated after the stirring was collected by centrifugal separation, washed with pure water, and dried in a heating furnace at a furnace inner temperature of 80° C. 800 g of pure water was added to the dried powder and the powder was dispersed in water again, to obtain a dispersion liquid. The obtained dispersion liquid was heated to a liquid temperature of 50° C., and 40 g of ammonia aqueous solution having a concentration of 25% was added dropwise while stirring. The stirring was performed for 1 hour while holding the temperature of 50° C., and 14 mL of tetraethoxysilane (TEOS) was added dropwise and stirred for 24 hours. 50 g of ammonium sulfate was added to the obtained reaction solution, the precipitated powder was collected by centrifugal separation, washed with pure water, and dried in a heating furnace at a furnace inner temperature of 80° C. for 24 hours, and a precursor of ferromagnetic powder was obtained.

The heating furnace at a furnace inner temperature of 1000° C. was filled with the obtained precursor of ferromagnetic powder in the atmosphere and subjected to thermal treatment for 4 hours.

The thermal-treated precursor of ferromagnetic powder was put into sodium hydroxide (NaOH) aqueous solution having a concentration of 4 mol/L, the liquid temperature was held at 70° C., stirring was performed for 24 hours, and accordingly, a silicon acid compound which was an impurity was removed from the thermal-treated precursor of ferromagnetic powder.

After that, by the centrifugal separation process, ferromagnetic powder obtained by removing the silicon acid compound was collected and washed with pure water, and ferromagnetic powder was obtained.

The composition of the obtained ferromagnetic powder was confirmed by Inductively Coupled Plasma-Optical Emission Spectrometry (ICP-OES), and Ga, Co, and Ti substitution type ε-iron oxide (ε-$Ga_{0.28}Co_{0.05}Ti_{0.05}Fe_{1.62}O_3$) was obtained. In addition, the X-ray diffraction analysis was performed under the same conditions as the conditions described regarding SrFe1 above, and it was confirmed that the obtained ferromagnetic powder has a crystal structure of a single phase which is an ε phase not including a crystal structure of an α phase and a γ phase (ε-iron oxide type crystal structure) from the peak of the XRD pattern.

Regarding the obtained (ε-iron oxide powder, an average particle size was 12 nm, an activation volume was 746 $nm^3$, an anisotropy constant Ku was $1.2 \times 10^5$ $J/m^3$, and a mass magnetization as was 16 $A \cdot m^2/kg$.

The activation volume and the anisotropy constant Ku of the hexagonal strontium ferrite powder and the (ε-iron oxide powder are values obtained by the method described above regarding each magnetic powder by using an oscillation sample type magnetic-flux meter (manufactured by Toei Industry Co., Ltd.).

In addition, the mass magnetization as is a value measured at the magnetic field intensity of 15 kOe by using an oscillation sample type magnetic-flux meter (manufactured by Toei Industry Co., Ltd.).

Example 1

Magnetic layer forming composition
Magnetic Liquid
Ferromagnetic powder (see Table 1): 100.0 parts
Oleic acid: 2.0 parts
Vinyl chloride copolymer (MR-104 manufactured by Kaneka Corporation): 10.0 parts
$SO_3Na$ group-containing polyurethane resin: 4.0 parts
  (Weight-average molecular weight: 70,000, $SO_3Na$ group: 0.07 meq/g)
Additive A: 10.0 parts
Methyl ethyl ketone: 150.0 parts
Cyclohexanone: 150.0 parts
Abrasive Solution
α-alumina (average particle size: 110 nm): 6.0 parts
A vinyl chloride copolymer (MR 110 manufactured by Description Kaneka Corporation): 0.7 parts
Cyclohexanone: 20.0 parts
Projection Formation Agent Liquid
Projection formation agent (see Table 1): 1.3 parts
Methyl ethyl ketone: 9.0 parts
Cyclohexanone: 6.0 parts
Lubricant and curing agent liquid
Stearic acid: 3.0 parts
Stearic acid amide: 0.3 parts
Butyl stearate: 6.0 parts
Methyl ethyl ketone: 110.0 parts
Cyclohexanone: 110.0 parts
Polyisocyanate (CORONATE (registered trademark) L manufactured by Tosoh Corporation): 3.0 parts The additive A described above is a polymer synthesized by a method disclosed in paragraphs 0115 to 0123 of JP2016-051493A.

Non-Magnetic Layer Forming Composition
Non-magnetic inorganic powder: (α-iron oxide): 80.0 parts
  (average particle size: 0.15 μm, average aspect ratio: 7, BET (Brunauer-Emmett-Teller) specific surface area: 52 $m^2/g$)

Carbon black (average particle size: 20 nm): 20.0 parts
Electron beam curable vinyl chloride copolymer: 13.0 parts
Electron beam curable polyurethane resin: 6.0 parts
Phenylphosphonic acid: 3.0 parts
Cyclohexanone: 140.0 parts
Methyl ethyl ketone: 170.0 parts
Butyl stearate: 2.0 parts
Stearic acid: 1.0 part
Back Coating Layer Forming Composition
Non-magnetic inorganic powder (α-iron oxide): 80.0 parts
   (average particle size: 0.15 μm, average aspect ratio: 7, BET specific surface area: 52 m$^2$/g)
Carbon black (average particle size: 20 nm): 20.0 parts
Carbon black (average particle size: 100 nm): 3.0 parts
Vinyl chloride copolymer: 13.0 parts
Sulfonic acid salt group-containing polyurethane resin: 6.0 parts
Phenylphosphonic acid: 3.0 parts
Cyclohexanone: 140.0 parts
Methyl ethyl ketone: 170.0 parts
Stearic acid: 3.0 parts
Polyisocyanate (CORONATE manufactured by Tosoh Corporation): 5.0 parts
Methyl ethyl ketone: 400.0 parts
Preparation of Each Layer Forming Composition The magnetic layer forming composition was prepared by the following method.

Components of the magnetic liquid were kneaded and diluted by an open kneader, and subjected to a dispersion process of 12 passes, with a transverse beads mill disperser and zirconia (ZrO$_2$) beads (hereinafter, referred to as "Zr beads") having a bead diameter of 0.5 mm, by setting a bead filling percentage as 80 volume %, a circumferential speed of rotor distal end as 10 m/sec, and a retention time for 1 pass as 2 minutes.

Regarding the abrasive solution, the components of the abrasive solution were mixed with each other and put in a transverse sand mill disperser together with Zr beads having a bead diameter of 1 mm, so as to perform the adjustment so that a value of bead volume/(abrasive solution volume+bead volume) was 60%, the sand mill dispersion process was performed for 180 minutes, and an ultrasonic dispersion filtering process was performed by using a flow type ultrasonic dispersion filtering device.

The magnetic liquid, the abrasive solution, the projection formation agent liquid, and the lubricant and curing agent liquid were introduced in a dissolver stirrer, and stirred at a circumferential speed of 10 m/sec for 30 minutes. Then, a process at a flow rate of 7.5 kg/min was performed for 3 passes with a flow type ultrasonic disperser, and then, the mixture was filtered with a filter having a hole diameter of 1 μm, to prepare a magnetic layer forming composition.

The non-magnetic layer forming composition was prepared by the following method.

Components except a lubricant (butyl stearate and stearic acid) were kneaded and diluted by an open kneader, and subjected to a dispersion process with a transverse beads mill disperser. After that, the lubricants (butyl stearate and stearic acid) were added and stirred with a dissolver stirrer, and mixed, to prepare a non-magnetic layer forming composition.

The back coating layer forming composition was prepared by the following method.

Components except a lubricant (stearic acid), polyisocyanate, and methyl ethyl ketone (400.0 parts) were kneaded and diluted by an open kneader, and subjected to a dispersion process with a transverse beads mill disperser. After that, the lubricants (stearic acid), polyisocyanate, and methyl ethyl ketone (400.0 parts) were added and stirred with a dissolver stirrer, and mixed, to prepare a back coating layer forming composition.

Manufacturing of Magnetic Tape

The non-magnetic layer forming composition was applied and dried on a biaxial stretching polyethylene naphthalate having a thickness of 6.0 μm so that a thickness after drying is 1.0 μm, and an electron beam was emitted at an acceleration voltage of 125 kV and energy of 40 kGy. The magnetic layer forming composition was applied and dried thereon so that a thickness after drying is 50 nm, and the back coating layer forming composition was applied and dried on a surface of the support on a side opposite to the surface where the non-magnetic layer and the magnetic layer were formed, so that a thickness after drying is 0.5 μm.

After that, the calender process was performed by using 7-step calender roll configured of only a metal roll at a calender speed of 80 m/min, linear pressure of 294 kN/m, and a calender temperature shown in Table 1. Then, the heating process was performed in an environment of an atmosphere temperature of 70° C. for 36 hours. After the heating process, slitting was performed to have a width of ½ inches (1 inch=0.0254 meters), a slit product was sent, cleaning of a surface of a magnetic layer was performed with a tape cleaning device attached to a device including a winding device so that a non-woven fabric and a razor blade are pressed against the surface of the magnetic layer, and a magnetic tape was obtained.

Examples 2 to 9 and Comparative Examples 1 to 4

A magnetic tape was obtained by the same method as in Example 1, except that the kind of the ferromagnetic powder, the kind of the projection formation agent, and/or the calender temperature were changed as shown in Table 1.

Evaluation Method (1) Difference ($S_{0.5}-S_{13.5}$)

The spacings $S_{0.5}$ and $S_{13.5}$ after the n-hexane cleaning were measured by the following method using tape spacing analyzer (TSA manufactured by Micro Physics), and a difference ($S_{0.5}-S_{13.5}$) was calculated from the measured values.

Five sample tests having a length of 5 cm were cut from each magnetic tape of the examples and the comparative examples, the n-hexane cleaning of each sample piece was performed by the method described, and $S_{0.5}-S_{13.5}$ were measured by the following method.

In a state where a glass plate (glass plate (model no.: WG10530) manufactured by Thorlabs, Inc.) comprised in TSA was disposed on the surface of the magnetic layer of the magnetic tape (that is, the sample piece), this hemisphere was pressed against the surface of the back coating layer of the magnetic tape by using a urethane hemisphere comprised in TSA as a pressing member at pressure of 0.5 atm. In this state, a certain region (150,000 to 200,000 μm$^2$) of the surface of the magnetic layer of the magnetic tape was irradiated with white light from a stroboscope comprised in the TSA through the glass plate, the obtained reflected light was received with a charge-coupled device (CCD) through an interference filter (filter selectively transmitting light at a wavelength of 633 nm), thereby obtaining an interference fringe image generated on ruggedness of this region.

This image was divided into 300,000 points, a distance (spacing) between the surface of the glass plate of each point on the magnetic tape side and the surface of the magnetic layer of the magnetic tape was obtained, this spacing is shown with a histogram, a mode of the histogram was obtained as the spacing.

The same sample piece was further pressed and the spacing was obtained by the method described above under the pressure of 13.5 atm.

Regarding the five sample pieces, an arithmetical mean of the spacings obtained under the pressure of 0.5 atm after the n-hexane cleaning was set as the spacing $S_{0.5}$, and regarding the five sample pieces, an arithmetical mean of the spacings obtained under the pressure of 13.5 atm after the n-hexane cleaning was set as the spacing $S_{13.5}$. The spacings $S_{0.5}$, and the spacing $S_{13.5}$, and the difference ($S_{0.5}-S_{13.5}$) obtained as described above are shown in Table 1.

(2) Coefficient of Friction (µ Value)

In an environment of an atmosphere temperature 32° C. and relative humidity of 80%, a magnetic head extracted from a linear tape-open generation 5 (LTO (registered trademark) G5) drive manufactured by IBM was attached to a tape running system, a magnetic tape having a tape length of 20 m was caused to run 3000 passes at a running speed of 4.0 m/s, while performing sending from a sending roll and winding around a winding roll, by applying a tension of 0.6 newton (N), and while bringing the surface of the magnetic layer and the magnetic head into contact with each other to slide thereon. In the running of the first pass and the running of the 3000-th pass, a friction force applied to the magnetic head during the running was measured using a strain gauge, and a coefficient of friction µ value was obtained from the measured friction force. The µ value obtained in the running of the first pass was set as "µ value (1p)", and the µ value obtained in the running of the 3000-th pass was set as "µ value (3000p)" and these were shown in Table 1.

(3) Signal-to-Noise-Ratio (SNR)

In an environment of an atmosphere temperature of 23° C. and relative humidity of 50%, in each magnetic tape of the examples and the comparative examples, the SNR was measured with a reel tester having a width of ½ inch (1 inch is 0.0254 meters), to which a magnetic head (hereinafter, also referred to as a "head") was fixed, by the following method.

A relative speed of head/magnetic tape was set as 5.5 m/sec, and the recording was performed with a (metal-in-gap (MIG) head (gap length of 0.15 µm, track width of 1.0 µm, 1.8 T)) as a recording head and by setting a recording current to an optimal recording current of each magnetic tape. The reproducing was performed by using a Giant Magnetoresistive (GMR) head (element thickness of 15 nm, distance between shields of 0.1 µm, track width of 1.0 µm) as a reproducing head. A signal having linear recording density of 350 kfci was recorded, and a reproducing signal was measured with a spectrum analyzer manufactured by Shibasoku Co., Ltd. The unit kfci is a unit of linear recording density (cannot be converted into the unit SI). As the signal, a part of a signal which is sufficiently stabilized after starting the running of the magnetic tape was used.

The recording and reproducing were performed under the conditions described above, and a ratio of an output value of a carrier signal and integral noise over whole spectral range was set as an SNR, and Broadband-SNR (SNR) obtained as a relative value, in a case where a value in Comparative Example 1 was set as a reference (0 dB) was shown in Table 1.

The results described above are shown in Table 1.

TABLE 1

| | Ferromagnetic powder | Projection formation agent | Calender temperature | $S_{0.5}$ (nm) | $S_{13.5}$ (nm) | $S_{0.5} - S_{13.5}$ (nm) | (1) µ value (1p) | (2) µ value (3000p) | µ value increase (2) − (1) | SNR |
|---|---|---|---|---|---|---|---|---|---|---|
| Example 1 | BaFe | Projection | 80° C. | 12.8 | 10.5 | 2.3 | 0.15 | 0.23 | 0.08 | +1.2 dB |
| Example 2 | BaFe | formation agent 1 | 100° C. | 12.0 | 10.0 | 2.0 | 0.21 | 0.25 | 0.04 | +1.5 dB |
| Example 3 | BaFe | Projection | 80° C. | 15.9 | 13.1 | 2.8 | 0.14 | 0.28 | 0.14 | +0.5 dB |
| Example 4 | BaFe | formation agent 2 | 100° C. | 15.2 | 12.8 | 2.4 | 0.20 | 0.31 | 0.11 | +0.8 dB |
| Example 5 | BaFe | Projection | 80° C. | 14.8 | 12.2 | 2.6 | 0.18 | 0.33 | 0.15 | +0.7 dB |
| Example 6 | BaFe | formation agent 3 | 100° C. | 14.0 | 11.7 | 2.3 | 0.23 | 0.36 | 0.13 | +1.0 dB |
| Example 7 | SrFe1 | Projection | 100° C. | 11.5 | 9.4 | 2.1 | 0.22 | 0.27 | 0.05 | +1.9 dB |
| Example 8 | SrFe2 | formation agent 1 | 100° C. | 11.7 | 9.7 | 2.0 | 0.20 | 0.24 | 0.04 | +1.8 dB |
| Example 9 | ε-iron oxide | | 100° C. | 11.3 | 9.2 | 2.1 | 0.25 | 0.29 | 0.04 | +1.8 dB |
| Comparative Example 1 | BaFe | Projection formation agent 4 | 80° C. | 29.8 | 22.4 | 7.4 | 0.14 | 0.45 | 0.31 | 0 |
| Comparative Example 2 | BaFe | | 100° C. | 27.7 | 22.5 | 5.2 | 0.16 | 0.52 | 0.36 | +0.3 dB |
| Comparative Example 3 | BaFe | Projection formation agent 5 | 80° C. | 10.8 | 7.3 | 3.5 | 0.21 | 0.45 | 0.24 | +0.9 dB |
| Comparative Example 4 | BaFe | | 100° C. | 9.3 | 6.1 | 3.2 | 0.25 | 0.51 | 0.26 | +1.2 dB |

From the results shown in Table 1, it can be confirmed that, in the magnetic tapes of the examples, an increase in µ value is small, that is, an increase in coefficient of friction is small, even in a case where the sliding with the magnetic head is repeated, compared to the magnetic tapes of the comparative examples.

In addition, from comparison of the examples, it can be confirmed that, in a case where the value $S_{0.5}$ is small, the SNR tends to increase.

Example 10

A magnetic tape was obtained by the same method as in Example 1, except that, after applying the magnetic layer forming composition, a homeotropic alignment process was performed by applying a magnetic field having a magnetic field intensity of 0.3 T to the surface of the coating layer in a vertical direction, and drying was performed to form a magnetic layer.

Examples 11 to 18

A magnetic tape was obtained by the same method as in Example 10, except that the kind of the ferromagnetic powder, the kind of the projection formation agent, and/or the calender temperature were changed as shown in Table 2.

Regarding the magnetic tapes in Examples 10 to 18, the evaluation was performed by the evaluation method, and values shown in Table 2 were obtained.

TABLE 2

|  | Ferromagnetic powder | Projection formation agent | Calender temperature | $S_{0.5}$ (nm) | $S_{13.5}$ (nm) | $S_{0.5} - S_{13.5}$ (nm) | (1) μ value (1p) | (2) μ value (3000p) | μ value increase (2) − (1) |
|---|---|---|---|---|---|---|---|---|---|
| Example 10 | BaFe | Projection | 80° C. | 12.8 | 10.5 | 2.3 | 0.15 | 0.23 | 0.08 |
| Example 11 | BaFe | formation agent 1 | 100° C. | 12.0 | 10.0 | 2.0 | 0.21 | 0.25 | 0.04 |
| Example 12 | BaFe | Projection | 80° C. | 15.9 | 13.1 | 2.8 | 0.14 | 0.28 | 0.14 |
| Example 13 | BaFe | formation agent 2 | 100° C. | 15.2 | 12.8 | 2.4 | 0.20 | 0.31 | 0.11 |
| Example 14 | BaFe | Projection | 80° C. | 14.8 | 12.2 | 2.6 | 0.18 | 0.33 | 0.15 |
| Example 15 | BaFe | formation agent 3 | 100° C. | 14.0 | 11.7 | 2.3 | 0.23 | 0.36 | 0.13 |
| Example 16 | SrFe1 | Projection | 100° C. | 11.5 | 9.4 | 2.1 | 0.22 | 0.27 | 0.05 |
| Example 17 | SrFe2 | formation agent 1 | 100° C. | 11.7 | 9.7 | 2.0 | 0.20 | 0.24 | 0.04 |
| Example 18 | ε-iron oxide |  | 100° C. | 11.3 | 9.2 | 2.1 | 0.25 | 0.29 | 0.04 |

Example 19

A magnetic tape was obtained by the same method as in Example 10, except that an aromatic polyester support shown in Table 3 was used as the non-magnetic support.

Example 20 to 32 and Comparative Example 5 to 10

A magnetic tape was obtained by the same method as in Example 19, except that the kind of the aromatic polyester support, the kind of the projection formation agent, and/or the calender temperature were changed as shown in Table 3.

In Table 3, the aromatic polyester support shown as "PET" is a support formed of only a single layer biaxial stretching polyethylene terephthalate film.

In Table 3, the aromatic polyester support shown as "PEN" is a support formed of only a single layer biaxial stretching polyethylene naphthalate film.

A thickness of each aromatic polyester support was 6.0 μm, the Yong's modulus in a longitudinal direction and the Yong's modulus in a width direction obtained by the following method were values shown in Table 3.

A sample piece having a length of 15 cm and a width of 10 mm was cut out from each aromatic polyester support. The cut-out sample piece was pulled by a universal tensile testing device (TENSILON manufactured by Baldwin Corporation) under conditions of a distance between chucks of 100 mm, a tensile rate of 10 mm/min, and a chart rate of 500 mm/min, in a measurement environment of a temperature of 23° C. and relative humidity of 50%. The Young's modulus of the sample piece in a longitudinal direction and a width direction are respectively calculated by a tangent of a rising part of a load-elongation curve obtained as described above.

In each magnetic tape of Examples 19 to 32 and Comparative Examples 5 to 10, the evaluation regarding an increase in coefficient of friction during the repeated running was performed by the following method.

In an environment of an atmosphere temperature 40° C. and relative humidity of 80%, a magnetic head extracted from a linear tape-open generation 5 (LTO (registered trademark) G5) drive manufactured by IBM was attached to a tape running system, a magnetic tape having a tape length of 20 m was caused to run 3000 passes at a running speed of 4.0 m/s, while performing sending from a sending roll and winding around a winding roll, by applying a tension of 0.6 newton (N), and while bringing the surface of the magnetic layer and the magnetic head into contact with each other to slide thereon. In the running of the first pass and the running of the 3000-th pass, a friction force applied to the magnetic head during the running was measured using a strain gauge, and a coefficient of friction μ value was obtained from the measured friction force. of the first pass was set as "μ value (1p)", and the μ value obtained in the running of the 3000-th pass was set as "μ value (3000p)", and an increase in μ value was calculated as "increase in μ value=μ value (3000p)−μ value (1p)". The calculated value is shown in Table 3.

TABLE 3

|  | Projection formation agent | Calender temperature | $S_{0.5}$ (nm) | $S_{13.5}$ (nm) | $S_{0.5} - S_{13.5}$ (nm) | Aromatic polyester support | | | μ value increase |
|---|---|---|---|---|---|---|---|---|---|
|  |  |  |  |  |  | Kind | Young's modulus in longitudinal direction (N/mm²) | Young's modulus in width direction (N/mm²) |  |
| Example 19 | Projection | 80° C. | 12.8 | 10.5 | 2.3 | PET | 3000 | 4000 | 0.15 |
| Example 20 | formation | 100° C. | 12.0 | 10.0 | 2.0 | PET | 3000 | 4000 | 0.13 |
| Example 21 | agent 1 | 80° C. | 12.8 | 10.5 | 2.3 | PEN | 3000 | 8000 | 0.17 |
| Example 22 |  | 100° C. | 12.0 | 10.0 | 2.0 | PEN | 3000 | 8000 | 0.12 |
| Example 23 |  | 100° C. | 12.0 | 10.0 | 2.0 | PET | 4500 | 7000 | 0.10 |
| Example 24 |  | 100° C. | 12.0 | 10.0 | 2.0 | PEN | 6000 | 7000 | 0.10 |
| Example 25 | Projection | 80° C. | 15.9 | 13.1 | 2.8 | PET | 4500 | 7000 | 0.14 |
| Example 26 | formation agent 2 | 100° C. | 15.2 | 12.8 | 2.4 | PET | 4500 | 7000 | 0.11 |
| Example 27 | Projection | 80° C. | 14.8 | 12.2 | 2.6 | PEN | 6000 | 7000 | 0.15 |
| Example 28 | formation agent 3 | 100° C. | 14.0 | 11.7 | 2.3 | PEN | 6000 | 7000 | 0.13 |
| Comparative Example 5 | Projection | 80° C. | 29.8 | 22.4 | 7.4 | PET | 7000 | 3500 | 0.55 |
| Comparative Example 6 | formation | 100° C. | 27.7 | 22.5 | 5.2 | PET | 7000 | 3500 | 0.60 |
| Comparative Example 7 | agent 4 | 80° C. | 29.8 | 22.4 | 7.4 | PEN | 2500 | 10000 | 0.52 |
| Comparative Example 8 |  | 100° C. | 27.7 | 22.5 | 5.2 | PEN | 2500 | 10000 | 0.55 |
| Comparative Example 9 | Projection | 80° C. | 10.8 | 7.3 | 3.5 | PET | 7000 | 3500 | 0.48 |
| Comparative Example 10 | formation agent 5 | 100° C. | 9.3 | 6.1 | 3.2 | PET | 7000 | 3500 | 0.45 |

TABLE 3-continued

|  | Projection formation agent | Calender temperature | $S_{0.5}$ (nm) | $S_{13.5}$ (nm) | $S_{0.5} - S_{13.5}$ (nm) | Aromatic polyester support | | | |
|---|---|---|---|---|---|---|---|---|---|
|  |  |  |  |  |  | Kind | Young's modulus in longitudinal direction (N/mm$^2$) | Young's modulus in width direction (N/mm$^2$) | μ value increase |
| Example 29 | Projection formation agent 1 | 80° C. | 12.8 | 10.5 | 2.3 | PEN | 2500 | 10000 | 0.35 |
| Example 30 |  | 100° C. | 12.0 | 10.0 | 2.0 | PEN | 2500 | 10000 | 0.33 |
| Example 31 |  | 80° C. | 12.8 | 10.5 | 2.3 | PET | 7000 | 3500 | 0.40 |
| Example 32 |  | 100° C. | 12.0 | 10.0 | 2.0 | PET | 7000 | 3500 | 0.33 |

One aspect of the invention is effective in a technical field of various magnetic recording media for data storage.

What is claimed is:

1. A magnetic recording medium comprising:
a non-magnetic support; and
a magnetic layer including a ferromagnetic powder and a binding agent on the non-magnetic support,
wherein a difference $S_{0.5}-S_{13.5}$ between a spacing $S_{0.5}$ measured by optical interferometry regarding a surface of the magnetic layer under a pressing force of 0.5 atm after n-hexane cleaning and a spacing $S_{13.5}$ measured by optical interferometry regarding the surface of the magnetic layer under a pressing force of 13.5 atm after n-hexane cleaning is equal to or smaller than 3.0 nm.

2. The magnetic recording medium according to claim 1, wherein the difference is 1.5 nm to 3.0 nm.

3. The magnetic recording medium according to claim 1, wherein the $S_{0.5}$ is 5.0 to 50.0 nm.

4. The magnetic recording medium according to claim 1, wherein the magnetic layer includes inorganic oxide particles.

5. The magnetic recording medium according to claim 4, wherein the inorganic oxide particles are composite particles of inorganic oxide and a polymer.

6. The magnetic recording medium according to claim 1, wherein the magnetic layer includes one or more kinds of lubricant selected from the group consisting of fatty acid, fatty acid ester, and fatty acid amide.

7. The magnetic recording medium according to claim 1, further comprising:
a non-magnetic layer including a non-magnetic powder and a binding agent between the non-magnetic support and the magnetic layer.

8. The magnetic recording medium according to claim 1, further comprising:
a back coating layer including a non-magnetic powder and a binding agent on a surface of the non-magnetic support opposite to a surface provided with the magnetic layer.

9. The magnetic recording medium according to claim 1, wherein the magnetic recording medium is a magnetic tape.

10. The magnetic recording medium according to claim 9, wherein the non-magnetic support is an aromatic polyester support, and a Young's modulus of the aromatic polyester support is equal to or greater than 3000 N/mm$^2$ in a longitudinal direction and equal to or greater than 4000 N/mm$^2$ in a width direction.

11. The magnetic recording medium according to claim 1, wherein the ferromagnetic powder is a hexagonal barium ferrite powder.

12. The magnetic recording medium according to claim 1, wherein the ferromagnetic powder is a hexagonal strontium ferrite powder.

13. The magnetic recording medium according to claim 1, wherein the ferromagnetic powder is an ε-iron oxide powder.

14. A magnetic recording and reproducing device comprising:
the magnetic recording medium according to claim 1; and
a magnetic head.

* * * * *